United States Patent [19]

Shirley

[11] Patent Number: 6,031,612
[45] Date of Patent: *Feb. 29, 2000

[54] APPARATUS AND METHODS FOR CONTOUR MEASUREMENT USING MOVABLE SOURCES

[75] Inventor: Lyle Shirley, Boxboro, Mass.

[73] Assignee: Massachusetts Institute of Technology, Cambridge, Mass.

[*] Notice: This patent is subject to a terminal disclaimer.

[21] Appl. No.: 09/241,354

[22] Filed: Feb. 2, 1999

Related U.S. Application Data

[63] Continuation-in-part of application No. 08/600,216, Feb. 12, 1996, Pat. No. 5,870,191
[60] Provisional application No. 60/087,960, Jun. 4, 1998.

[51] Int. Cl.⁷ .................................................. G01B 11/24
[52] U.S. Cl. .......................................... 356/359; 356/357
[58] Field of Search .................................. 356/345, 357, 356/359, 360, 353, 349, 358

[56] References Cited

U.S. PATENT DOCUMENTS

| | | | |
|---|---|---|---|
| 4,139,304 | 2/1979 | Redman et al. | 356/358 |
| 4,349,277 | 9/1982 | Mundy et al. | 356/376 |
| 4,499,492 | 2/1985 | Hutchin | 358/107 |
| 4,781,455 | 11/1988 | Machler et al. | 356/34 |
| 4,832,489 | 5/1989 | Wyant et al. | 356/359 |
| 5,146,293 | 9/1992 | Mercer et al. | 356/356 |
| 5,289,264 | 2/1994 | Steinbichler | 356/376 |
| 5,455,670 | 10/1995 | Payne et al. | 356/5.1 |

FOREIGN PATENT DOCUMENTS

| | | |
|---|---|---|
| 2554086 | 6/1977 | Germany . |
| 58-173412 | 10/1983 | Japan . |
| 61-198009 | 9/1986 | Japan . |
| 2142427A | 1/1985 | United Kingdom . |

OTHER PUBLICATIONS

Fercher, A.F., Two–wavelength speckle interferometric techique for rough surface contour measurement, Optical Engineering, May 1986, pp. 623–626.
Butters, Von J. N., "Using the Laser to Measure Length," *Materialprüf*, 24:245–248 (Jul. 7, 1982) (German Abstract).
Zou et al., "Two–Wavelength DSPI Surface Contouring Through the Temperature Modulation of a Laser Diode," *Optik*, 94(4):155–158 (1993).
Peng et al., "A Simplified Multi–Wavelength ESPI Contouring Technique Based on a Diode Laser System,"*Optik*, 91(2)81–85 (1992).
Fercher et al., "Two–Wavelength Speckle Interferometric Technique for Rough Face Contour Measurement," *Optical Engineering*, 25(5):623–626 (May 1986).
Fercher et al., "Rough Surface Interferometry with a Two–Wavelength Heterodyne Speckle Interferometer," *Applied Optics*, 24(14):2181–1288 (Jul. 15, 1985).
Thalmann et al., "Dimensional Profiling by Electronic Phase Measurement," *SPIE Industrial Laser Interferometry*, 746:61–68 (1987).

Takeda et al., "Fourier–Transform Speckle Profilometry: Three–Dimensional Shape Measurements of Diffuse Objects with Large Height Steps and/or Spatially Isolated Surfaces," *Applied Optics*, 33(34):7829–7837 (Dec. 1, 1994).
Volotovskaya, N.K., "Relationship Between the Frequency and Angular Correlation Function of a Signal that is Scattered by an Extensive Body," *Radio Engineering and Electronic Physics J.* 16(6):1048–1049 (Jun. 1971).
Dresel et al., "Three–Dimensional Sensing of Rough Surfaces by Coherence Radar," *Applied Optics*, 31(7):919–925 (Mar. 1, 1992).
Shirley et al., "Advanced Techniques for Target Discrimination Using Laser Speckle," *Massachusetts Institute of Technology, The Lincoln Laboratory J.*, 5(3):367–440 (1992).
Shirley, L. G., "Applications of Tunable Lasers to Laser Radar and 3D Imaging," *Technical Report 1025, Massachusetts Institute of Technology, Lincoln Laboratory*, (1995).
K. Creath, "Phase–measurement interferometry techniques," Chap. 5 in *Progress in Optics XXVI*, E. Wolf Ed. pp. 349–393, Elsevier Science Publishers, New York, NY (1988).
G.T. Reid, R.C. Rixon, and H.I. Messer, "Absolute and comparative measurements of three–dimensional shape by phase measuring moire topography," *Optics and Laser Technology*, 315–319, Dec., (1984).
G. Indebetouw, "Profile measurement using projection of running fringes," *Applied Optics*, 17(18), 2930–2933 (1978).
V. Srinivasan, H.C. Liu, and M. Halioua, "Automated phase– measuring profilometry of 3–D diffuse objects," *Applied Optics*, 23(18), 3105–3108 (1984).
L.S. Wang, B.N. Dobbins, K. Jambunathan, and X.P. Wu, "Fibre optic shape measuring system using phase stepping speckle pattern interferometry," *SPIE*, 2088, MJ. Downs Ed., pp. 104–110 (1993).
L.H. Bieman, "Absolute measurement using field shifted moire," *SPIE*, 1614, 259–264 (1991).

(List continued on next page.)

*Primary Examiner*—Frank G. Font
*Assistant Examiner*—Zandra Smith
*Attorney, Agent, or Firm*—Testa, Hurwitz & Thibeault, LLP

[57] ABSTRACT

Apparatus and methods of measuring position information of a point on the surface of an object. In one embodiment, the apparatus includes two sources of radiation positioned to illuminate the point on the surface of the object with radiation from each of the sources. The radiation from each of the sources is coherent with respect to the radiation from the other source. A control system moves each of the sources relative to the other and changes the phase of the radiation from at least one of the sources relative to the phase of the radiation from the other source as measured at the point on the surface of the object. A detector is positioned to receive radiation scattered by the point and a processor in communication with the detector calculates position information in response to the change in phase of the radiation from the source and the received radiation scattered by the point on the surface of the object.

31 Claims, 18 Drawing Sheets

OTHER PUBLICATIONS

H.O. Saldner and J.M. Huntley, "Temporal phase unwrapping: application to surface profiling of discontinuous objects," *Applied Optics*, 36(13), 2770–2775 (1997).

K. Creath, "Phase–shifting speckle interferomety," *Applied Optics*, vol. 24, No. 18, (1985).

J.M Huntley and H.O. Saldner, "Shape measurement by temporal phase unwrapping and spatial light modulator–based fringe projector," *SPIE*, vol. 3100, 185–192, (1997).

R.W. Wygant, S.P. Almeida, O.D.D. Soares, "Surface inspection via projection interferometry," *Applied Optics*, vol. 27, No. 22, (1988).

D. Paoletti and S. Spagnolo, "Fast Fourier Transformed Electronic Speckle Contouring for Diffuse Surfaces Profilometry," *Optics and Lasers in Engineering*, 20, 87–96, (1994).

G. Sansoni, L. Biancardi, U. Minoni, F. Docchio, "A Novel, Adaptive System for 3–D Optical Profilometry Using a Liquid Crystal Light Projector," *IEEE Transactions on Instrumentation and Measurement*, vol. 43, No. 4, (1994).

M. Chang, C. Ho, C. Hu, "A Design for an Optical Coordinate Measuring Machine System," *Proc. Natl. Sci. Counc. ROC(A)*, vol. 18, No. 5, 477–484, (1994).

C. Joenathan, B. Pfister, H.J. Tiziani, "Contouring by electronic speckle pattern interferometry employing dual beam illumination," *Applied Optics*, vol. 29, No. 13, (1990).

USE EQ. (71) TO CALULATE HEIGHT VALUE FROM N — STEP 232'

APPARATUS AND METHODS FOR CONTOUR MEASUREMENT USING MOVABLE SOURCES

CROSS-REFERENCE TO RELATED APPLICATIONS

This application is a continuation-in-part of U.S. patent application Ser. No. 08/600,216 which was filed on Feb. 12, 1996, now U.S. Pat. No. 5,870,191, and claims priority to provisional U.S. patent application number 60/087,960 which was filed Jun. 4, 1998.

GOVERNMENT SUPPORT

Work described herein was supported by Federal Contract No. F19628-95-L-002, awarded by the United States Air Force. The Government may have certain rights in the invention.

FIELD OF THE INVENTION

The invention relates to the field of surface measurement and, more specifically, to the field of non-contact surface measurement.

BACKGROUND OF THE INVENTION

Dimensional metrology, the measurement of the size and shape of objects, is very important in today's manufacturing environment in which machines perform much of the fabrication and assembly of complex objects composed of many subassemblies. The shape and size of each component in a complex assembly, such as an automobile, must be held to close tolerances to ensure that the components fit together properly.

Ideally such measurements of shape and size are accomplished without physical contact in order to save time in making the measurement. Many non-contact measurement methods make use of available machine vision systems. The measurement of surface contour information is an especially difficult problem in machine vision systems since depth information is often lost or is difficult to interpret. To compensate for the loss of depth information and the difficulty in interpreting the information which is available, many machine vision systems utilize light to create moiré patterns on the surface of the object in order to obtain contour information.

Interferometric methods have also been used when detailed measurements of the surface are needed. Although interferometric systems provide surface contour information, they are sensitive to vibrations in both the object being measured and the source of illumination being used. The present invention is less sensitive to the vibration problem that has affected previous systems.

SUMMARY OF THE INVENTION

A method for determining three-dimensional position information of a point on the surface of an object which is useful for a wide variety of application, including but not limited to, measurement of size and shape of manufactured components having complex surfaces. In one embodiment, the method includes providing two sources of radiation separated by a distance, illuminating the point on the surface with radiation from each source, moving each source relative to the other source, detecting radiation scattered from the point and calculating position information for the point in response to the movement of the sources and the detected radiation. In another embodiment, the method includes providing a detector at the point on the surface to receive the illuminating radiation rather than radiation scattered from the point. In yet another embodiment, the method also includes the step of changing the phase of radiation from one of the sources relative to the other source.

The invention also features an apparatus for determining three-dimensional position information of a point on the surface of an object. The apparatus includes two sources of coherent radiation separated by a distance, a control system for moving each source, a detector for receiving radiation scattered from the point on the surface and a processor receiving signal from the detector. The processor calculates position information in response to the movement of the sources and the radiation received at the detector. In one embodiment, the apparatus includes a detector position at the point on the surface of the object to receive radiation illuminating the point rather than radiation scattered from the point. In another embodiment, the control system changes the phase of at least one of the sources. In yet another embodiment, the detector includes a plurality of photodetectors.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

While describing the embodiment of the invention, reference will be made to "sources" and "sources of radiation." These terms are meant to refer to any source of radiation, including highly localized sources of radiation.

Figure 1:
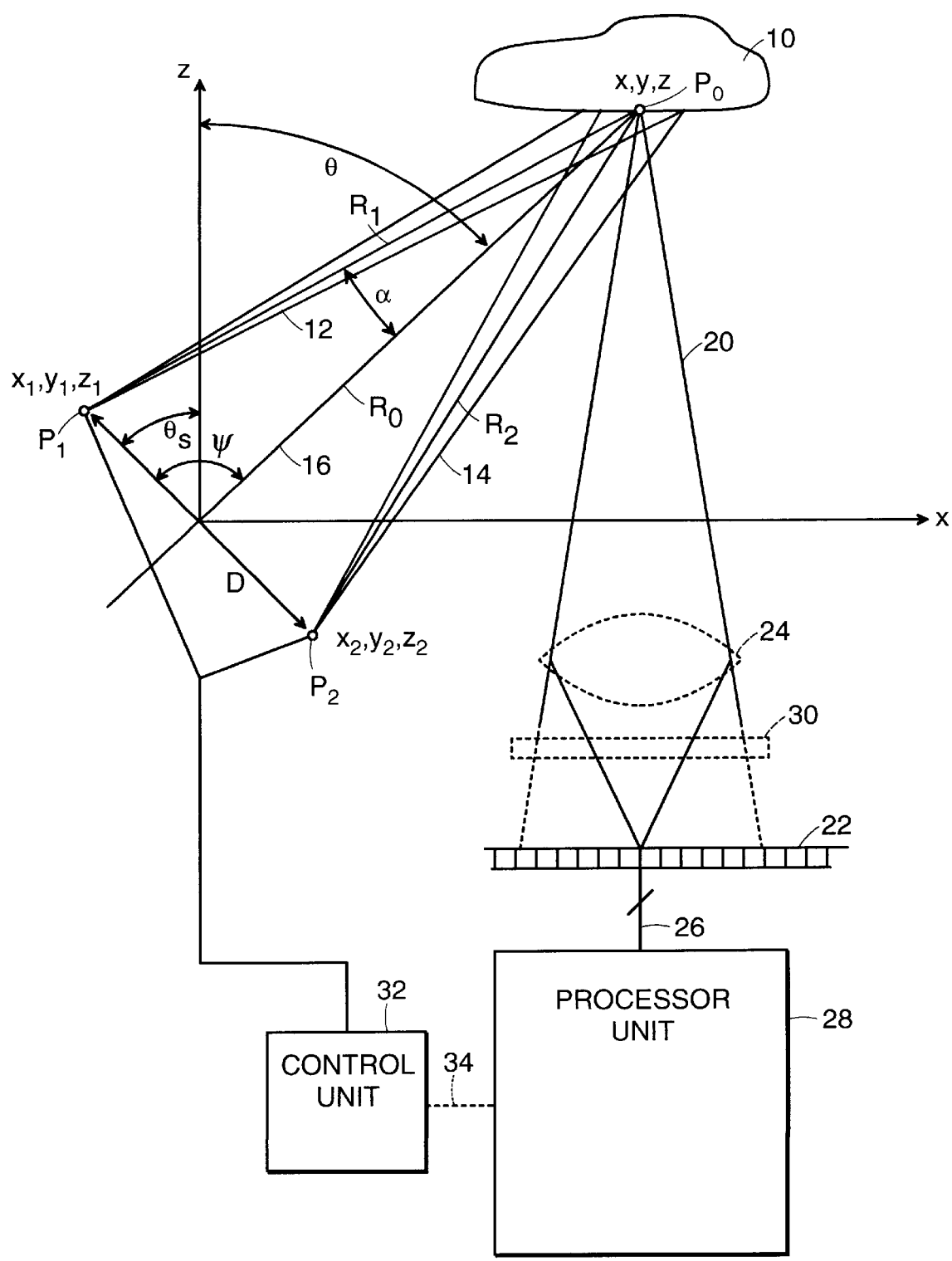
FIG. 1 is a block diagram of an embodiment of the invention for making surface contour measurements.

Referring to FIG. 1, and in brief overview, two sources of radiation $P_1$ and $P_2$ are separated by a fixed distance D and have spatial coordinates of $(x_1,y_1,z_1)$ and $(x_2,y_2,z_2)$, respectively. The radiation from each of the sources $P_1$ and $P_2$ is coherent with respect to the radiation from the other one of the sources. Each source, $P_1$ and $P_2$, directs its respective divergent beam of radiation 12 and 14 toward a point $P_0$ on the surface of an object 10. The distance from each respective source of radiation, $P_1$ and $P_2$, to the point on the surface $P_0$ is indicated by $R_1$ and $R_2$, respectively. $\psi$ is the angle between the line extending from the origin to the point $P_0$ and the line extending between sources $P_1$ and $P_2$, $\theta_s$ is the angle between the z axis and the line extending between the sources $P_1$ and $P_2$, and $\alpha$ is the half angle subtended by the source points as viewed from $P_0$. Each beam 12, 14 is substantially polarized in the same direction as the other beam 14, 12 and may be independently scannable to simultaneously illuminate different regions on the object 10. Alternatively, the entire object 10 may be illuminated simultaneously.

Light scattered 20 by the point $P_0$ is detected by a photodetector 22. In one embodiment, the photodetector 22 comprises an array of photodetector elements providing a two dimensional image of the object 10 to be measured. In a further embodiment, the array of photodetector elements is a charge coupled device (CCD). The detector 22 provides an output signal 26 comprising one or more individual signals, each one associated with a corresponding one of the photodetector elements of the detector 22.

In a preferred embodiment, a focusing element 24 is positioned between the point $P_0$ on the surface of the object 10, and the photodetector 22, so as to image the illuminated portion of the object including point $P_0$ onto the detector 22. Because of the roughness of the surface of the object, and because the illuminating radiation is coherent, the focused image will be speckled. The output signal 26 from the photodetector 22 is the input signal to a processor unit 28.

A polarizer 30, in one embodiment, is placed between the focusing element 24 and the detector 22. Polarizer 30 is oriented in a direction to maximize its coincidence with the principal polarization component of the scattered light 20, so as to improve the speckle contrast. With this arrangement, the signal-to-noise ratio associated with light scattered from the surface of the object 10 is maximized.

In one embodiment, the processor 28 is a single processor which operates on detector output signals 26 associated with each of the photodetector elements of the detector array 22. In another embodiment, the processor 28 is a multiprocessor having a plurality of individual processors and each photodetector element provides an input signal to a respective one of the processors. In yet another embodiment, in which the detector 22 is a CCD array, a plurality of the CCD elements provide an input signal to a respective processor of a multiprocessor. With the multiprocessor arrangements, computations on signals from a plurality of individual photoelements occur substantially simultaneously, thereby enhancing the signal processing speed.

A control unit 32 controls the operation of the sources of radiation, $P_1$ and $P_2$, so as to change the phase of the radiation of one of the sources relative to the phase of the radiation from the other source as measured at the point $P_0$ on the surface of the object 10. The processor 28 may be in communication with control unit 32 via signal line, or bus 34. For example, in certain applications it may be desirable for the processor 28 to process signals from the detector 22 at specific times relative to the scanning of the sources $P_1$ and $P_2$ over the surface of the object 10 or relative to the rate at which the frequency of the radiation from the sources is swept. Since such scanning and frequency sweeping operations are controlled by control unit 32, communication between the control unit 32 and the processor 28 is desirable in these circumstances. It will be appreciated that the control unit 32 and the processor 28 may be physically separate units or, alternatively, may be implemented by a single processing system.

Figure 2:
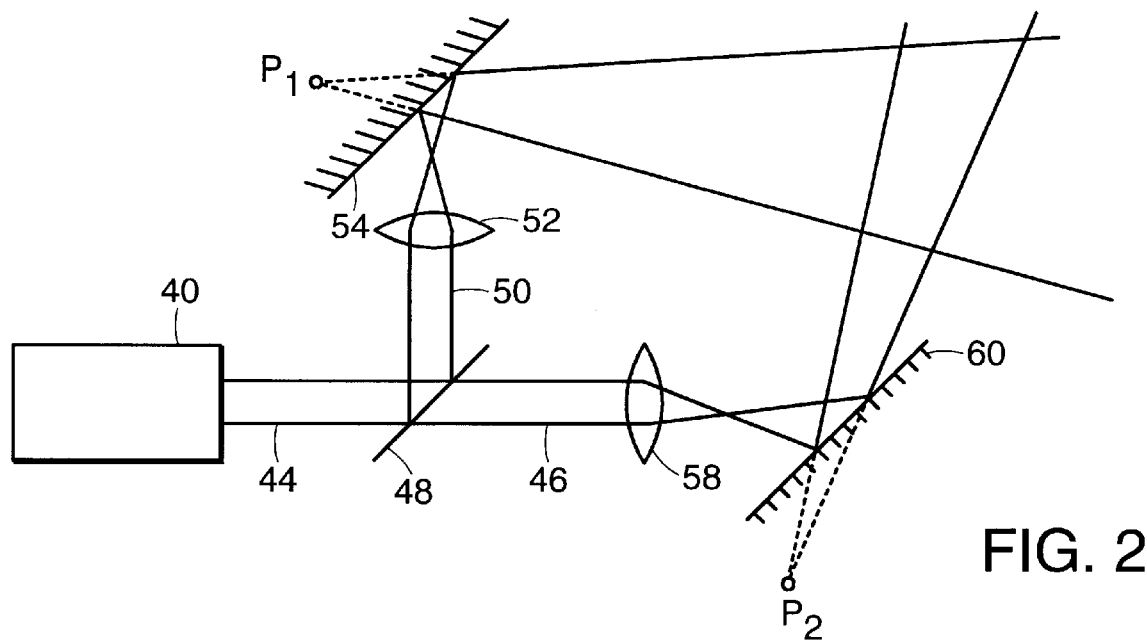
FIG. 2 is a block diagram of an embodiment of the two sources of radiation shown in FIG. 1.

Referring now to FIG. 2, in one embodiment the sources of radiation $P_1$ and $P_2$ are formed from the radiation emitted from a tunable laser 40. The radiation beam 44 emitted by the tunable laser 40 is split by a beam splitter 48. The radiation beam 50 reflected by the beam splitter 48 is caused to diverge by a lens 52. The divergent beam is then reflected by a moveable aiming mirror 54. The radiation beam reflected by the aiming mirror 54 provides one of the sources of coherent radiation, $P_1$. Similarly, the radiation beam 46 passing through the beam splitter 48 is caused to diverge by a lens 58 which directs the divergent beam to a second moveable aiming mirror 60. The radiation beam reflected by mirror 60 provides the second source of radiation, $P_2$. Aiming mirrors 54 and 62 may be pivotable to selectively illuminate the surface of object 10. They may also be moveable to vary the positions of sources $P_1$ and $P_2$.

Figure 2A:
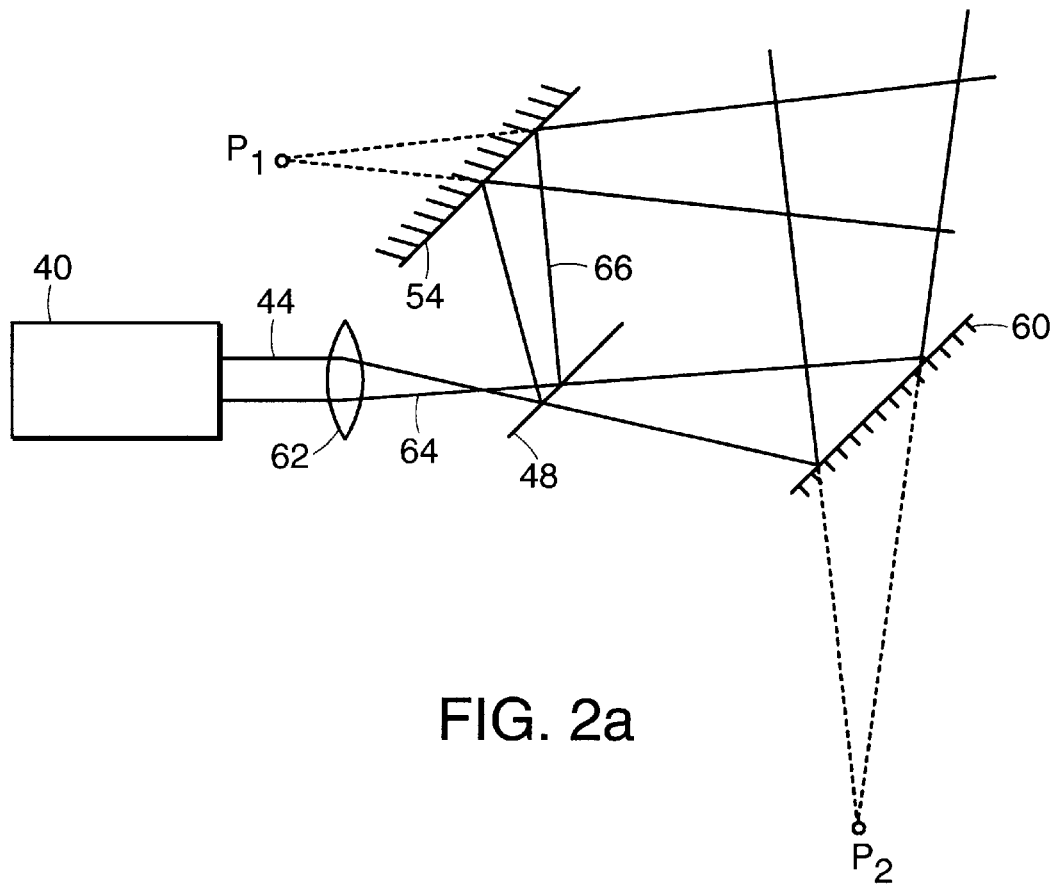
FIG. 2a is a block diagram of another embodiment of the two sources of radiation shown in FIG. 1.

Referring to FIG. 2a, another embodiment of the sources of radiation $P_1$ and $P_2$ is shown to include a tunable laser source 40 providing a beam of radiation 44. The radiation beam 44 passes through a lens 62 which causes the beam to diverge, providing divergent beam 64. Divergent beam 64 is then reflected by beam splitter 48 to provide a first beam 66. A second beam 68 passes through the beam splitter 48, as shown. Moveable aiming mirrors 54 and 60 reflect beams 66 and 68 to provide sources $P_1$ and $P_2$, respectively.

Figure 2B:
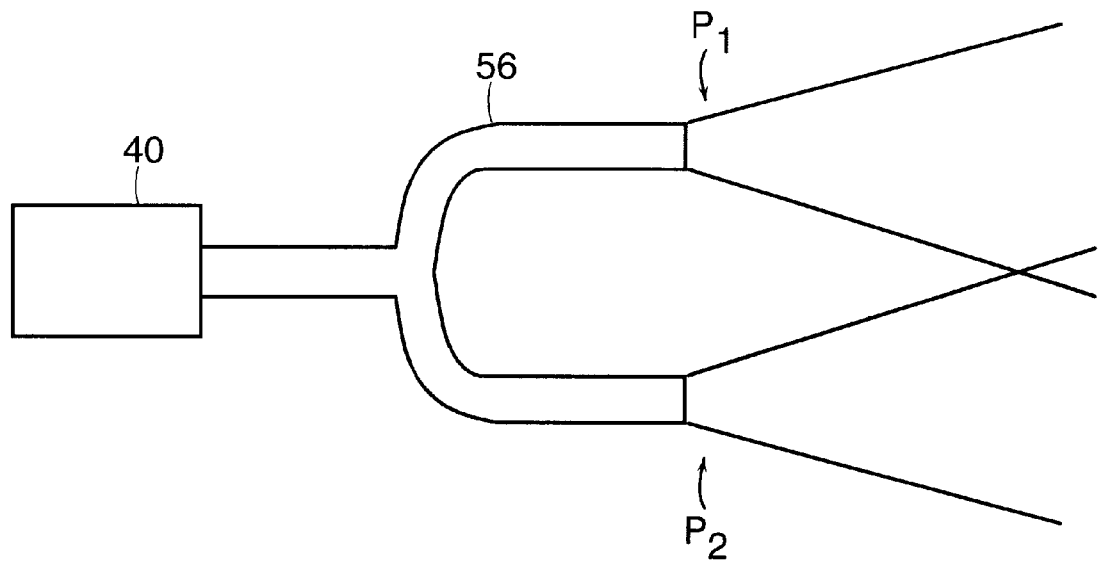
FIG. 2b is a block diagram of yet another embodiment of the two sources of radiation shown in FIG. 1.

Referring to FIG. 2b, in another embodiment the sources of radiation $P_1$ and $P_2$ are split from the radiation emitted from a tunable laser 40 using a fiber optic splitter 56. Fibers may have beam-forming elements at their end to control or set the divergence angle of the two beams, and in one embodiment the beam-forming elements may be lenses. Sources $P_1$ and $P_2$ may alternatively be formed from a pair of tunable lasers which are frequency locked together. Other suitable embodiments of radiation sources include any sources which generate a wave having a controllable phase, such as microwaves and sonic waves.

In one embodiment, the sources of radiation $P_1$ and $P_2$ are maintained at a fixed distance D from one another by attaching each source to one end of a bar comprised of a material having a small coefficient of expansion. In another embodiment, the sources of radiation $P_1$ and $P_2$ are not held at a fixed distance but instead the distance between them, D, is known to a high degree of accuracy.

Figure 3:
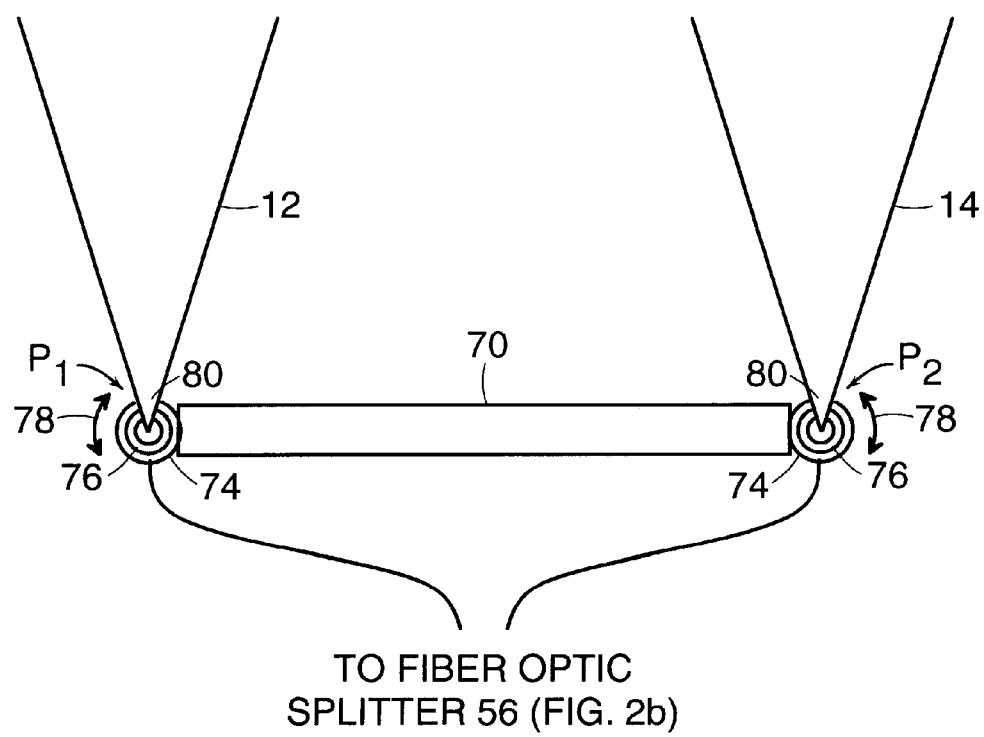
FIG. 3 is a block diagram of an embodiment of apparatus for supporting the two sources of radiation of FIG. 1 at a fixed distance relative to one another.

One illustrative bar 70 for supporting radiation sources $P_1$ and $P_2$ at a fixed distance D relative to one another is shown in FIG. 3. A bar 70 is provided with sockets 74 at opposite ends thereof. A ball joint 76 is pivotally positioned within each of the sockets 74, as shown. Each of the ball joints 76 has an end of a fiber from a fiber optic splitter 56 (shown in FIG. 2b) positioned therein and an aperture 80 through which divergent radiation passes. Fibers may have beam-forming elements at their end to control or set the divergence angle of the two beams and in one embodiment the beam forming elements are lenses. In operation, the ball joints 76 are pivotable as shown by arrows 78 within the respective socket 74 and may be under the control of control unit 32 (shown in FIG. 1). With this arrangement, the divergent beams 12 and 14 provided by the sources $P_1$ and $P_2$ at the ends of the fibers can be directed as desired to illuminate all, or a portion, of the object 10 including the point $P_0$ to be processed, while maintaining a fixed separation distance D.

The coordinates of point $P_0$ on the surface of object 10 are (x,y,z). Although the x and y coordinates of $P_0$ are generally directly determinable from the geometry of the detector 22 and the object 10, taking into account any magnification by intervening focusing element 24, the depth coordinate z, where the z axis is defined as being parallel to the optical axis of the imaging system, is not directly obtainable. The depth coordinate, z, however can be measured by first considering the difference in path length $$s = R_2 - R_1 + S_0 \quad (1)$$

from the radiation sources $P_1$ and $P_2$ to the point $P_0$ on the surface of the object 10. The quantity $S_0$ is included to account for any path length difference in the beams that may occur before they reach points $P_1$ and $P_2$.

If s is non-zero, then changing the frequency of the radiation emitted from sources $P_1$ and $P_2$ will result in the phase of the radiation from one source, as measured at point $P_0$, changing with respect to the other source. This phase change results in a modulation of intensity of the radiation at point $P_0$. The change in frequency, $\Delta v$, required to complete one cycle of a change in intensity is given by the expression:

$$\Delta v = \frac{c}{s} \quad (2)$$

where c is the speed of light. Thus, by measuring the change in laser frequency, $\Delta v$, needed to cause one oscillation of intensity, the path difference s may be determined. The measurement of z is then based on determining the value of s for each value of x and y, as discussed below.

Improved accuracy in the determination of s is obtained by measuring $\Delta v$ over many oscillation cycles. In practice it is convenient to work in terms of the number of oscillation cycles N (not necessarily a whole number) induced by a total change in frequency B.

N is given in terms of $\Delta v$ and B as:

$$N = \frac{B}{\Delta v} \quad (3)$$

Elimination of $\Delta v$ from Eq. (3) using Eq. (2) yields the following expression for s in terms of N:

$$s = \frac{c}{B} N \quad (4)$$

It should be noted that the number of oscillation cycles N induced by a frequency scan of length B corresponds to the number of interference fringes that move across the measurement point $P_0$ during the frequency scan. The interference fringes are produced by the interference of radiation emitted from the sources $P_1$ and $P_2$. These oscillations occur whether or not the fringes are resolved by the imaging lens 24.

An uncertainty $\Delta N$ in the measurement of N, corresponds to an uncertainty $\Delta s$ in s of $$\Delta s = \frac{c}{B} \Delta N = s \frac{\Delta N}{N} \quad (5)$$

Equation (5) indicates that if the uncertainty $\Delta N$ to which a single oscillation cycle can be determined remains constant, the uncertainty $\Delta s$ in s is reduced by a factor equal to the number of cycles N that are measured. There are numerous methods for determining N to various levels of resolution $\Delta N$ that are known to those skilled in the art. Examples of methods yielding a resolution of roughly one oscillation-cycle count ($\Delta N=1$) are to perform a fast Fourier transform (FFT) on the data sequence or to count zero crossings of the high-pass filtered signal. Improved resolution of a fraction of an oscillation-cycle count ($\Delta N<1$) can be achieved, for example, by finding the argument of the discrete Fourier transform (DFT) where the magnitude of the DFT is maximized or by inspecting the phase of the oscillation cycle at the ends of the frequency scan. One technique known to those skilled in the art for accurate inspection of the phase is to insert a phase modulator in one leg of the beam path, i.e., between the beam splitter or fiber-optic splitter and one of the sources $P_1$ or $P_2$ in FIGS. 2, 2(a), and 2(b).

If $I_1$, $I_2$, and $I_3$ are signal intensities corresponding to phase shifts induced by the phase modulator of $-90°$, $0°$, and $90°$, respectively, then the phase $\phi$ of the oscillation cycle is given by:

$$\phi = \tan^{-1}\left(\frac{I_1 - I_3}{2I_2 - I_1 - I_3}\right) \quad (6)$$

An uncertainty $\Delta\phi$ in phase is converted to an uncertainty $\Delta N$ in the cycle count by dividing by $2\pi$.

For a typical frequency scan of B=15 THz for a tunable diode laser, and for an uncertainty of $\Delta N=1$ cycle, an uncertainty of $\Delta s=20$ $\mu$m is provided. An uncertainty of $\Delta N=0.1$ cycle would improve the uncertainty in s to $\Delta s=2.0$ $\mu$m, provided that the spread in s over the lateral resolution is smaller than this quantity. If the spread in s over the lateral resolution on the surface of the object is larger than $\Delta s$, then the improved resolution in the measurement of s may still result in an improved estimate of an average or representative value of s over that lateral resolution.

In terms of the coordinate system:

$$s = \sqrt{(x-x_2)^2 + (y-y_2)^2 + (z-z_2)^2} - \sqrt{(x-x_1)^2 + (y-y_1)^2 + (z-z_1)^2} \quad (7)$$

To make the calculation simpler, assume that the two sources $P_1$ and $P_2$ are located symmetrically about the origin at $(x_1,y_1,z_1)$ and $(-x_1,-y_1,-z_1)$. Then Eq. (7) becomes, in terms of $(x_1,y_1,z_1)$:

$$s = \sqrt{(x+x_1)^2 + (y+y_1)^2 + (z+z_1)^2} - \sqrt{(x-x_1)^2 + (y-y_1)^2 + (z-z_1)^2} \quad (8)$$

Solving for z, Eq. (8) becomes:

$$z = \frac{4(xx_1 + yy_1)z_1 \pm \frac{s}{2}\sqrt{16(xx_1+yy_1)^2 + (s^2 - 4z_1^2)(s^2 - D^2 - 4x^2 - 4y^2)}}{s^2 - 4z_1^2} \quad (9)$$

where D is the distance between the two sources $P_1$ and $P_2$. Thus z is determined to within an ambiguity due to the existence of the positive and negative roots of Eq. (9). One way to avoid this ambiguity is by illuminating the object 10 so that the s=0 line (labeled 16 in FIG. 1 for the case $s_0$=0) does not bisect the region of the object to be imaged. One way of moving the s=0 line is to vary $s_0$ in Eq. (1).

The sensitivity of the system to changes in s is shown by the ratio of $\Delta s/\Delta z$, where $\Delta z$ is the uncertainty in z introduced by an uncertainty $\Delta s$ in the value of s. This ratio ranges between zero, for a system lacking any practical range sensitivity and two, for a theoretically maximal system. A value of two is impractical to achieve because the surface of the object 10 would have to lie between the two point sources $P_1$ and $P_2$ and only one side of the surface could be illuminated from each beam. The ratio $\Delta s/\Delta z$ is calculated by taking the partial derivative of s with respect to z, from which the following expression for the range resolution is obtained:

$$\Delta z = \Delta s \left( \frac{z+z_1}{\sqrt{R_0^2 + R_0 D\cos\psi + \frac{D^2}{4}}} - \frac{z-z_1}{\sqrt{R_0^2 - R_0 D\cos\psi + \frac{D^2}{4}}} \right)^{-1} \quad (10)$$

In equation (10), $R_0$ is the distance from the origin to $P_0$ and $\psi$ is the angle between the line extending from the origin to the point $P_0$ and the line extending from point $P_1$ to point $P_2$ as shown in FIG. 1. A useful configuration that provides good range resolution is to set $\psi$=90° for which the expression for $\Delta z$ simplifies to $$\Delta z = \frac{\Delta s}{2\sin\alpha\cos\theta_s} \quad (11)$$

where $\theta_s$ and $\alpha$ are as shown in FIG. 1. In terms of $R_0$ and D, $\tan \alpha = D/(2R_0)$. Equation (11) shows that the range resolution improves as the angle $\alpha$ increases and the angle $\theta_s$ decreases. For values of $\Delta s$=5 $\mu$m, $\alpha$=10°, and $\theta_s$=45°, the range resolution is $\Delta z$=20 $\mu$m.

Uncertainties ($\Delta x$, $\Delta y$) in the lateral position (x, y) of the observation point P also affect the range resolution $\Delta z$. If the two source points lie in the x-z plane, then the measurement of z is insensitive to uncertainties $\Delta y$. For $\psi$=90°, uncertainties $\Delta x$ in x cause an uncertainty $$\Delta z = \Delta x \tan \theta_s \quad (12)$$

in the measurement of z. Therefore, angles near $\theta_s$=0° offer the best immunity to uncertainty in the lateral position of point $P_0$.

Because the depth of focus decreases as the lateral resolution of the optical system improves, there is a tradeoff between lateral resolution and maximum object depth. One method for reducing this limitation in object depth is to sequentially focus on different range planes and use only those pixels that are within the depth of focus. For example, a 100 $\mu$m lateral resolution would limit the depth of field to the order of 1 cm, and an object with a 10 cm range could be imaged at full resolution by focusing sequentially at ten different ranges. To minimize the effects of depth of field, the z axis can be defined in a direction that minimizes the range extent, i.e., normal to the average plane of the surface of the object. To increase the lateral area that can be imaged without losing lateral resolution, multiple cameras (i.e., detector arrays 22) can be used to cover the entire area of interest of the object 10 or individual cameras can be used for inspecting regions of interest. Alternatively, the focal plane of single lenses can be populated with a plurality of detector arrays. These arrays can be translated independently to inspect various regions of the object at high resolution. Translation of individual detector arrays along the z axis or tilting of the detector arrays can achieve simultaneous focusing for regions of the object at different depths to increase the allowable object depth.

A potential difficulty with the optical imaging system in FIG. 1 is that the bistatic angle between the sources and the detector may introduce shadowing effects. These effects can be reduced by placing the lens closer to the sources as in FIG. 4 and using the lens in an off-axis configuration where the detector is offset laterally in the image plane. If the lens is designed for this purpose or has a sufficiently large field of view, then aberrations resulting from off-axis imaging can be minimized.

Figure 5:
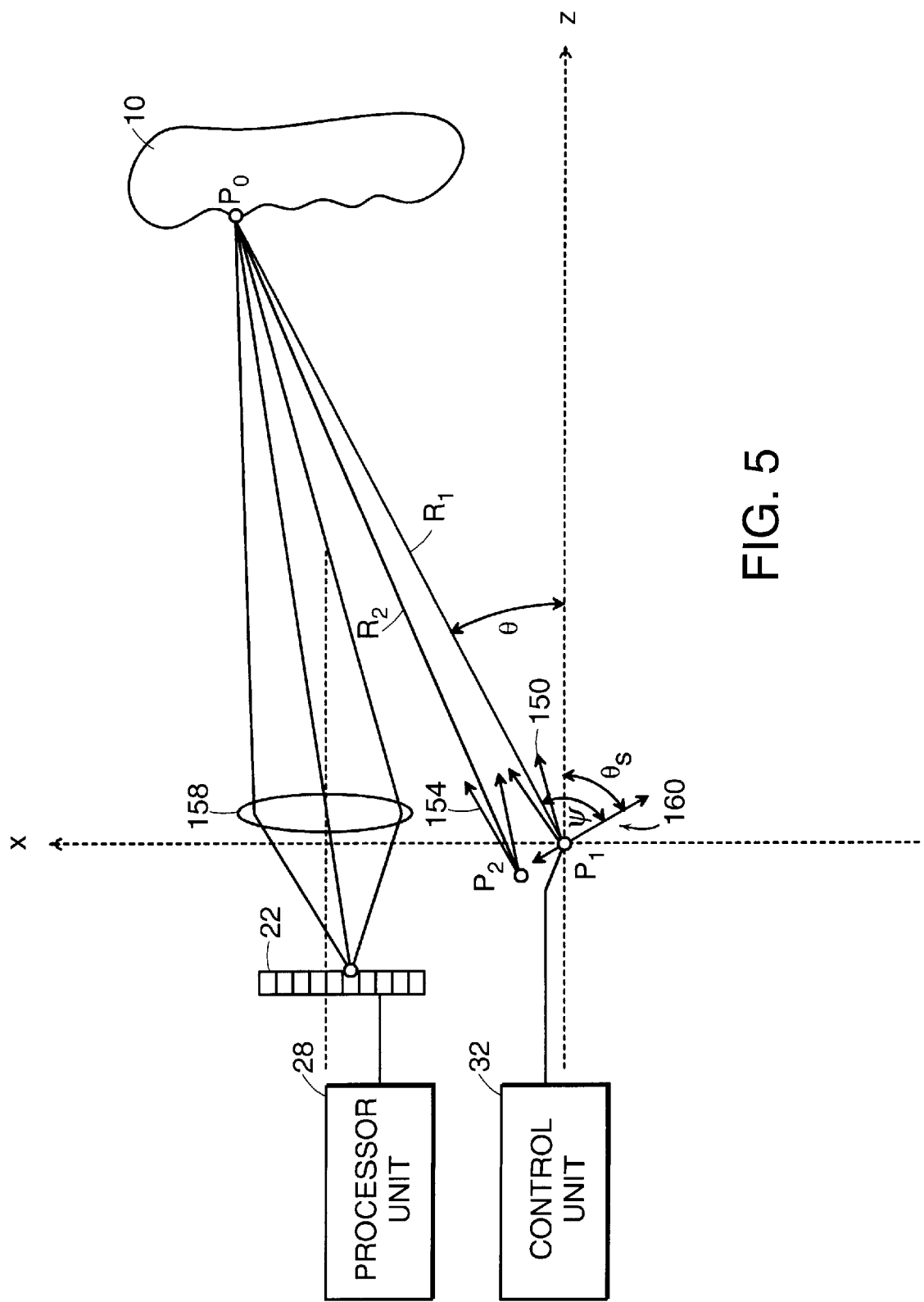
FIG. 5 is a block diagram of an alternate embodiment of the invention for making surface contour measurements.

Referring to FIG. 5, an alternate embodiment of the present invention includes a moveable radiation source $P_1$ and a stationary radiation source $P_2$, each providing a divergent beam 150 and 154 and having a path length labeled $R_1$ and $R_2$ between such radiation source and a point $P_0$ on the surface of an object 10, respectively. The sources $P_1$ and $P_2$ may be generated by any suitable source of coherent radiation, such as a monochromatic laser, which is split to provide the two point sources $P_1$ $_{and}$ $_{P2}$. Moreover, various techniques are suitable for splitting the radiation from the coherent radiation source, such as the beam splitter embodiments of FIGS. 2 and 2a and the fiber-optic splitter embodiment of FIG. 2b.

Figure 4:
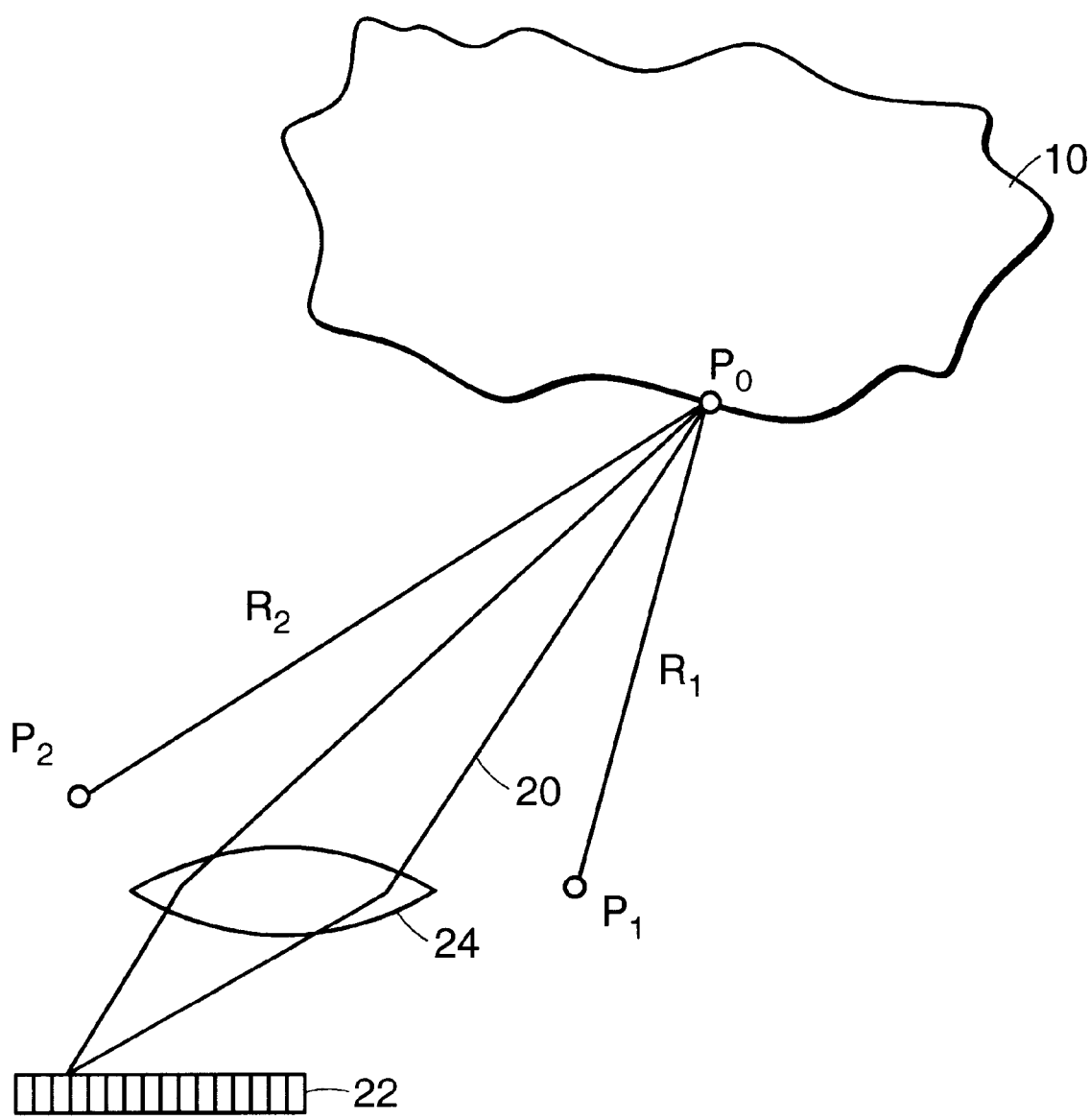
FIG. 4 is another embodiment of the imaging system in FIG. 1.

The divergent beams 150 and 154 are directed toward a surface of an object 10 on which a point $P_0$ is located having position information which is to be measured. Illumination scattered by the surface of the object 10 is focused by a focusing element, or lens 158 to impinge on a detector array 22. The lens can be used in an off-axis configuration as illustrated in FIG. 4 to reduce shadowing effects due to the bistatic angle. An optional polarizer (not shown) of the type described above in conjunction with FIG. 1 may be positioned between the focusing element 158 and the detector array 22 in order to improve the contrast of the speckle image incident on the detector array 22.

The detector array 22 is in communication with a processor unit 28 for processing the image incident on the detector, as will be described. A control unit 32 is in communication with at least the moveable source $P_1$ for moving the source $P_1$ along an axis 160. As noted above, the control unit 32 and the processor unit 28 may be implemented by separate devices or alternatively, may be part of a single system. Additionally, the control unit 32 and the processor unit 28 may communicate with each other, as may be desirable in certain applications.

As described above in conjunction with FIG. 1, the depth coordinate z associated with a point $P_0$ on the surface of the object 10 can be determined as a function of the difference, $R_2-R_1$, between the path lengths $R_1$ and $R_2$ of beams 150 and 154, from sources $P_1$ and $P_2$ respectively, to point $P_0$. In the embodiment of FIG. 5, the phase of the radiation from moveable source $P_1$ is changed by moving the source $P_1$ along the axis 160 under the control of the control unit 32. With this arrangement, oscillations in the intensity at point $P_0$ are produced.

The instantaneous coordinates of moveable point source $P_1$ are $$x_1 = al_s, \; y_1 = am_s, \text{ and } z_1 = an_s \qquad (13)$$

where a represents the magnitude of translation of point source $P_1$, and $l_s$, $m_s$, and $n_s$ are direction cosines representing the direction of translation with respect to the x, y and z axes, respectively. The phase difference of the radiation from the sources $P_1$ and $P_2$ as measured after propagation to point $P_0$ is given by:

$$\phi = \frac{2\pi}{\lambda}(R_2 - R_1) + \phi_0 \qquad (14)$$

where $\phi_0$ represents a constant phase offset that may exist between the two coherent sources $P_1$ and $P_2$. As $P_1$ translates along axis 160, the value of $R_1$ changes, causing $\phi$ to vary as a function of a.

The number of intensity oscillations that occur at point $P_0$ (or interference fringes that cross point $P_0$) as source $P_1$ moves away from the origin is given by:

$$N = \frac{\phi(a) - \phi(0)}{2\pi} = \frac{R_0 - R_1}{\lambda} \qquad (15)$$

$$= \frac{1}{\lambda}\left[\sqrt{x^2 + y^2 + z^2} - \sqrt{(x - al_s)^2 + (y - am_s)^2 + (z - an_s)^2}\right]$$

where $R_0$ is the distance between point $P_0$ and the origin of the coordinate system, $\phi$ (a) is the angle of translation measured at a, and $\phi(0)$ is the angle of translation measured at 0. Consideration of Eq. (15) reveals that the number of intensity oscillations, N, resulting from movement from source $P_1$ is independent of the location of the stationary source $P_2$. This independence permits the sources $P_1$ and $P_2$ to be positioned in close proximity to one another. With this arrangement, the divergent beams 150 and 154 from respective sources $P_1$ and $P_2$ experience common disturbances, such as air turbulence and vibrations. In this way, the effects of such disturbances are minimized. Additionally, beams 150 and 154 reach the surface of the object 10 with substantially identical polarization.

Note also that a small separation between the sources $P_1$ and $P_2$ produces a fringe pattern on the surface of the object 10 with a large fringe spacing that can be easily resolved by the imaging lens 24.

Since the magnitude of translation a of point source $P_1$ is relatively small as compared to the value of $R_0$, Eq. (15) can be approximated to second order in $a/R_0$ as follows:

$$N = \frac{a}{\lambda}\left[\cos\psi - \frac{1}{2}\sin^2\psi\frac{a}{R_0} - \frac{1}{2}\cos\psi\sin^2\psi\frac{a^2}{R_0^2}\right] \qquad (16)$$

where $\psi$ is the angle between the line extending from the origin to the point $P_0$ and the line defined by the direction of translation of $P_1$.

Eq. (16) indicates that to lowest order in $a/R_0$, knowledge of N allows the angle $\psi$ to be determined. Given knowledge of $\psi$ from three or more locations, the (x,y,z) coordinates of $P_0$ could be determined through triangulation. We now describe an embodiment similar to the one corresponding to FIG. 1, where the x and y coordinates are determined from location of the image point in the detector array.

The measurement of z for a given (x,y) location can be made either by determining the number of intensity oscillation cycles N corresponding to a movement of $P_1$ by a distance or by measuring the rate at which such intensity oscillations occur. Consider first a measurement of z based on determining the number of cycles N. With N known, all of the variables in Eq. (15) are known except for z. Solving Eq. (15) for z yields the following expression:

$$z = \frac{An_s \pm \bar{p}\sqrt{A^2 - (\bar{p}^2 - n_s^2)(x^2 + y^2)}}{\bar{p}^2 - n_s^2} \qquad (17)$$

where $$A = xl_s + ym_s + \frac{a}{2}(\bar{p}^2 - 1) \qquad (18)$$

and $$\bar{p} = \frac{\lambda N}{a} \qquad (19)$$

Equation (19) defines a dimensionless parameter having a magnitude ranging between zero and unity that represents the average modulation rate of the speckle intensity in terms of oscillation cycles N per wavelength unit traveled by $P_1$. For values of a approaching zero, Eq. (17) can be approximated as:

$$z = \frac{(xl_s + ym_s)n_s \pm \bar{p}\sqrt{(xl_s + ym_s)^2 - (\bar{p}^2 - n_s^2)(x^2 + y^2)}}{\bar{p}^2 - n_s^2} \qquad (20)$$

The expressions for z in Eqs. 17 and 20 can be simplified by setting $n_s = 0$, so that the translation of source $P_1$ is confined to the x-y plane. This arrangement represents a good practical choice for translation of source $P_1$, as described below. The resulting expression for z can be written as follows:

$$z = \sqrt{R_0^2 - x^2 - y^2} \qquad (21)$$

where the distance $R_0$ from the scattering point $P_0$ to the origin of the x, y coordinate system is given by the exact expression:

$$R_0 = \frac{xl_s + ym_s + \frac{a}{2}(\bar{\rho}^2 - 1)}{\bar{\rho}} \quad (22)$$

When a is small, $R_0$ can be approximated as:

$$R_0 = \frac{xl_s + ym_s}{\bar{\rho}} \quad (23)$$

Consider now the measurement of z based on knowledge of the instantaneous rate at which the intensity oscillations occur. The instantaneous oscillation rate $\rho$ can be expressed in a manner similar to the average oscillation rate in Eq. (19), as follows:

$$\rho = \lambda \frac{\partial N}{\partial a} \quad (24)$$

Substituting the expression for the number of intensity oscillations, N, from Eq. (15) into Eq. (24) yields:

$$\rho = \frac{xl_s + ym_s + zn_s - a}{\sqrt{(x - al_s)^2 + (y - am_s)^2 + (z - an_s)^2}} \quad (25)$$

where the relation:

$$l_s^2 + m_s^2 + n_s^2 = 1 \quad (26)$$

has been used to simplify the numerator. For small values of a, $\rho$ can be approximated as:

$$\rho \approx \cos\psi - \sin^2\psi \frac{a}{R_0} - \frac{3}{2}\cos\psi\sin^2\psi \frac{a^2}{R_0^2} \quad (27)$$

Solving, Eq. (25) for z yields:

$$z = \frac{O \pm Q}{\rho^2 - n_s^2} \quad (28)$$

where $$O = [xl_s + ym_s + a(\rho^2 - 1)]n_s \quad (29)$$

and $$Q = \rho\sqrt{a(\rho^2 - 1)[2(xl_s + ym_s) - a(l_s^2 + m_s^2)] + (xl_s + ym_s)^2 - (\rho^2 - n_s^2)(x^2 + y^2)} \quad (30)$$

When $n_s = 0$, Eq. (29) can be written in the form of Eq. (21), with:

$$R_0 = \frac{\sqrt{a(\rho^2 - 1)[2(xl_s + ym_s) - a] + (xl_s + ym_s)^2}}{|\rho|} \quad (31)$$

For small values of a, Eqs. (28) and (31) can be approximated by Eqs. (20) and (23), respectively, with $\bar{\rho}$ replaced by $\rho$.

In order to estimate range resolution, consider the uncertainty $\Delta z$ in the measurement of z that would be introduced by an uncertainty ($\Delta N$ or $\Delta \rho$) in the quantity being measured. For simplicity, this calculation is based on the approximate expression for N given by Eq. (16). To find $\Delta z$, we take the partial derivative of N (or $\rho$) with respect to z and equate this derivative to the ratio $\Delta N/\Delta z$ (or $\Delta\rho/\Delta z$), to yield:

$$\Delta z = G \frac{R_0}{a} \lambda \Delta N = G R_0 \Delta \rho \quad (32)$$

where $$G = \frac{1}{n_s - (ll_s + mm_s + nn_s)n} \quad (33)$$
$$= \frac{1}{\sin\theta[\cos\theta_s\sin\theta - \cos\theta\sin\theta_s\cos(\phi - \phi_s)]}$$

is a geometrical factor that accounts for the direction of translation and the direction to the scattering point. In the first form for G, $$l = x/R_0,\ m = y/R_0,\ \text{and}\ n = z/R_0 \quad (34)$$

are direction cosines for the Point $P_0$. In the second form for G, $\theta$ and $\phi$ are the polar and azimuthal angles, respectively, representing the direction from the origin to $P_0$ in a spherical-polar coordinate system. Likewise, the direction of translation of the source point is given by $\theta_s$ and $\phi_s$.

Consideration of Eq. (32) reveals that range resolution degrades with increasing object distance $R_0$ and improves with increasing magnitude of translation a of source $P_1$. Consideration of Eq. (33) reveals that the geometrical factor G ranges between unity and infinity, where unity corresponds to the best range resolution achievable.

The optimal direction of translation of source $P_1$ for a given scattering-point direction is obtained from Eq. (33) by choosing $l_s$, $m_s$, and $n_s$ such that G is minimized for the given values of l, m and n. Application of this constraint yields:

$$(l_s, m_s, n_s) = \left(-\frac{nl}{\sqrt{1-n^2}}, -\frac{nm}{\sqrt{1-n^2}}, \sqrt{1-n^2}\right) \quad (35)$$

which implies that the optimal translation direction is orthogonal to the line extending from the origin to the scattering point $P_0$ ($\psi = 90°$) and lies in the plane of incidence formed by said line and the z axis ($\phi_s = \phi$). Substitution of the values in Eq. (35) into Eq. (33) results in:

$$G = \frac{1}{\sqrt{1-n^2}} = \frac{1}{\sqrt{l^2+m^2}} = \frac{1}{\sin\theta} \quad (36)$$

From Eq. (36), it is observed that the best achievable G value of unity occurs when n=0 (θ=90°), which implies that the scattering point lies in the x-y plane. It is also observed that the resolution degrades such that G approaches infinity for scattering points lying on the z axis. For example, G=2 for θ=30° and G=5.76 for θ=10°. Although it is not possible to satisfy Eq. (35) for every point in the image without changing the translation direction for each point, the condition for optimal resolution can be approximated by satisfying Eq. (35) for a representative image point.

By Eqs. (25) and (27), the instantaneous modulation rate ρ depends on the offset magnitude a of the translating point. For techniques based on measuring ρ, it is desirable for ρ to vary as little as possible during the scan so that there is nearly a one-to-one correspondence between values of ρ and z. Then standard spectral-analysis techniques can be applied to estimate the value of ρ and determine z. To quantify the degree of nonuniformity in ρ that occurs during a scan, we define:

$$\chi = \frac{\rho(a) - \rho(0)}{\rho(0)} = \frac{\rho(a) - \cos\psi}{\cos\psi} \quad (37)$$

Substitution of the approximate form for ρ from Eq. (27) into Eq. (37) and keeping only the lowest order term containing a, yields:

$$\chi \approx \frac{\sin^2\psi}{\cos\psi} \frac{a}{R_o} \quad (38)$$

Equation (38) states that the modulation nonuniformity increases linearly in the ratio $a/R_0$ of scan length to object distance. Furthermore, the nonuniformity vanishes when ψ=0° and increases without bound when ψ=90°. We observe, however, that there is no range resolution when ψ=0° because all points on the ψ=0° line have the same modulation rate, regardless of range, i.e., G=∞ in Eq. (33). Therefore, there is a tradeoff between minimizing the nonuniformity and obtaining optimal range resolution.

A reasonable measurement configuration that simultaneously provides good range resolution and reduced modulation nonuniformity is to set $n_s=0$ and to use an off-axis optical system with the offset in the $\phi_s$ direction, i.e., $\phi=\phi_s$. Then Eq. (33) for G reduces to:

$$G = \frac{-2}{\sin(2\theta)} \quad (39)$$

As an illustrative example of the measurement technique, suppose it is desired to image an object that is 200 mm by 200 mm in the x-y plane from a distance of $R_0$=1 m using a laser of wavelength λ=0.7 μm. If $n_s$=0 and the center of the object is located at θ=30° and $\phi=\phi_s$, then, by Eq. (39), the geometric factor G will vary between 2.1 and 2.6 over the field of view. By Eq. (32), a translation of a=5 mm will produce a range uncertainty of Δz=16 μm (in the middle of the image) for an uncertainty in the number of oscillations of one-twentieth of a count, i.e., ΔN=0.05. The total number of oscillation counts for the entire scan is N=3600 by Eq. (16). To estimate the modulation nonuniformity at the center of the image, we set ψ=60° in Eq. (38) and obtain χ=0.0075 so that there is less than a 1% nonuniformity over the scan. This nonuniformity could be reduced further by introducing slight variations in the scan rate during the scan to compensate for any change in frequency during the measurement.

Figure 6:
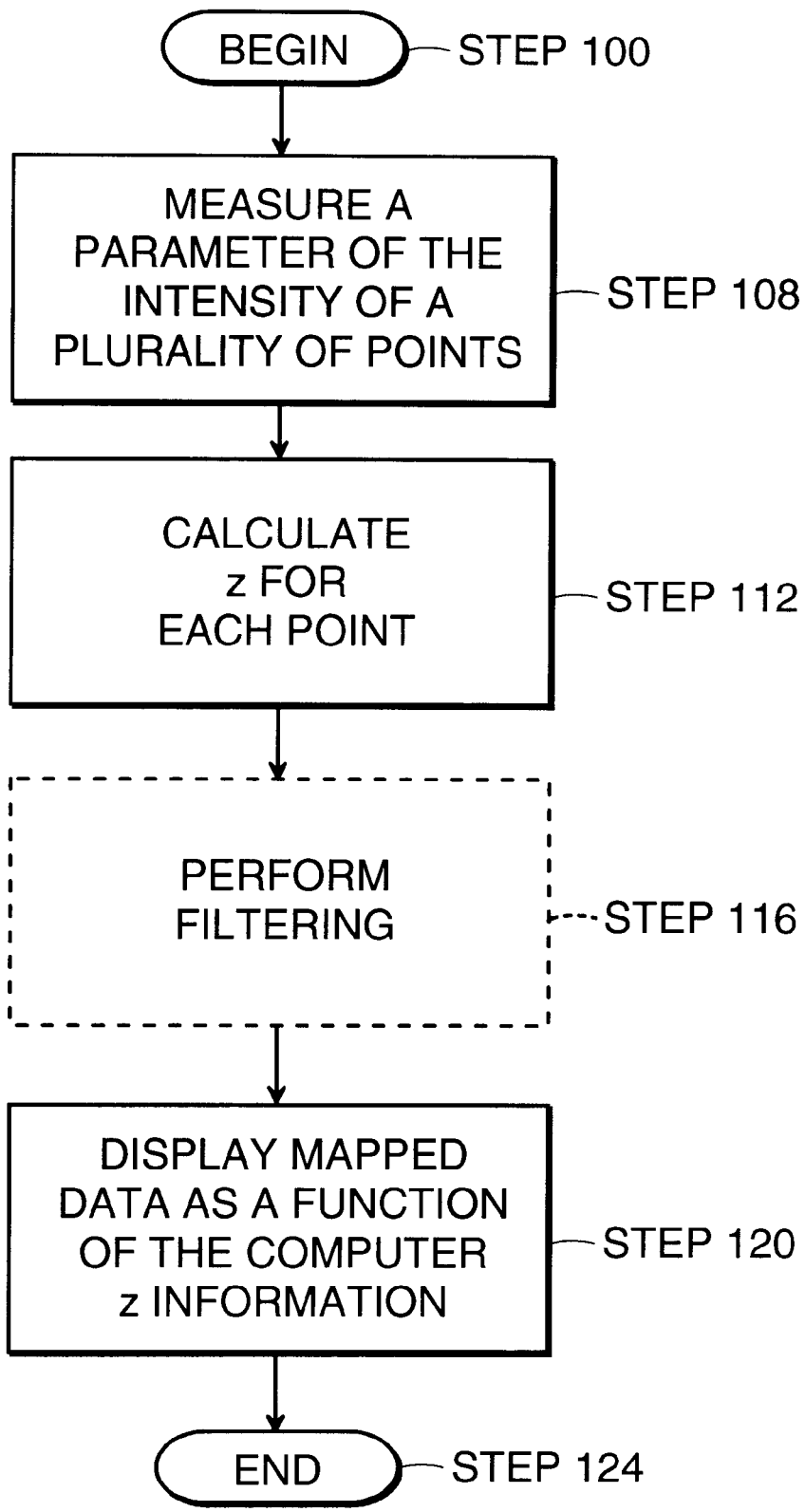
FIG. 6 is a flow diagram of an embodiment of the steps utilized by the processor of FIGS. 1 and 5 in making surface contour measurements.

FIG. 6 depicts an illustrative series of steps to be executed by the processor 28 of FIGS. 1 and 5 to determine the depth coordinate z at each point (x, y) on the object. The processor begins (step 100) by measuring a parameter of the intensity of the radiation scattered by a plurality of illuminated points on the object surface (step 108). From this information, the z coordinate for each measured point is calculated (step 112).

An optional filtering process may be performed in step 116. Suitable filters known to those skilled in the art include, but are not limited to, smoothing filters, median filters and curve-fitting filters. Thereafter, the mapped points can be displayed or output in anyway known to one of ordinary skill in the art, following which the process is terminated in step 124, as shown. In one embodiment, the mapped points are plotted as a function of the computed z information on a mesh plot in step 120.

Figure 6A:
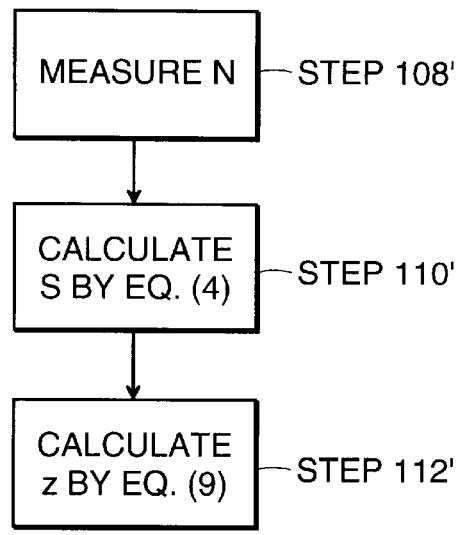
FIG. 6a is one embodiment of a portion of the flow diagram of FIG. 6.

Referring also to FIG. 6a, one embodiment of steps 108 and 112, suitable for use with the embodiment of FIG. 1 is shown. In step 108', the intensity of the scattered illumination is measured as a function of laser frequency offset and N is measured using one of the methods known to those skilled in the art. Thereafter, s is calculated for each location (x,y) in step 110' using Eq. (4) and z is calculated for each location (x,y) in step 112' using Eq. (9).

Figure 6B:
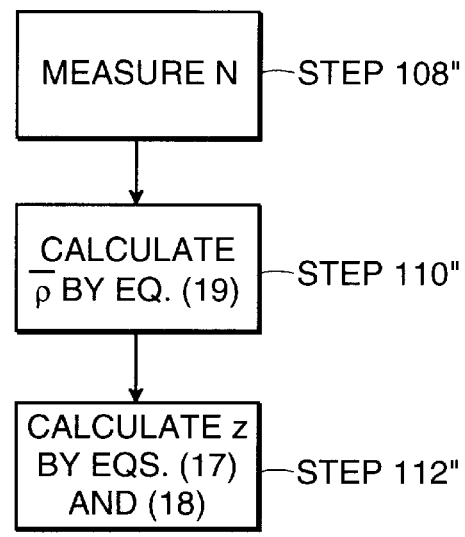
FIG. 6b is another embodiment of a portion of the flow diagram of FIG. 6.
Figure 6C:
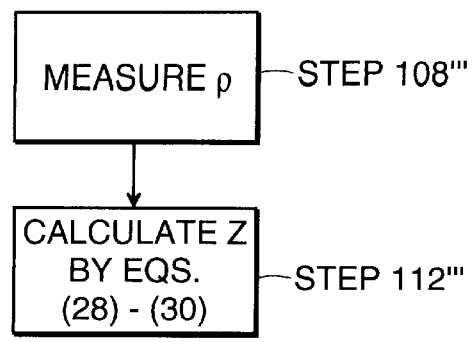
FIG. 6c is yet another embodiment of a portion of the flow diagram of FIG. 6.

An alternate embodiment of process steps 108 and 112 for use in conjunction with the embodiment of FIG. 5 is shown in FIG. 6b. In this case, the parameter of the intensity measured in step 108" is the number of times, N (not necessarily a whole number), that the intensity cycles as the moveable source $P_1$ (FIG. 5) translates. Once N has been determined in step 108" through one of the methods known to be skilled in the art it is converted to $\bar\rho$ by Eq. (19) in step 110". z is then calculated in step 112" with the use Eqs. (17) and (18). Another embodiment of process steps 108 and 112 for use in conjunction with the embodiment of FIG. 5 is shown in FIG. 6C. Here, the parameter of the intensity measured in step 108" is the instantaneous oscillation rate ρ at which oscillations occur as the source point $P_1$ translates. ρ is converted to z in step 112" through Eqs. (28)–(30).

Figure 7:
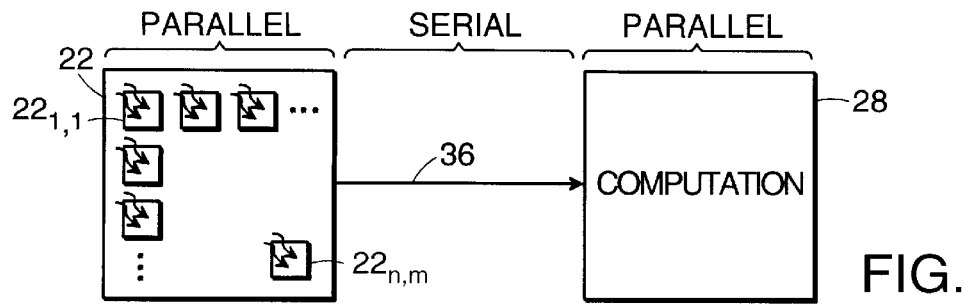
FIG. 7 is a block diagram of one embodiment of a detector and processor arrangement for use with the systems of FIGS. 1 and 5.

Various arrangements of detector 22 and processor 28 are possible. In one embodiment, shown in FIG. 7, the photodetector elements $22_{1,1}$ to $22_{n,m}$ of the detector array 22 are read out serially. The serial output 36 of detector array 22 provides an input to a processor 28. Processor 28 may comprise a single processor or alternatively, may be a multiprocessor comprising a plurality of processors.

Figure 7A:
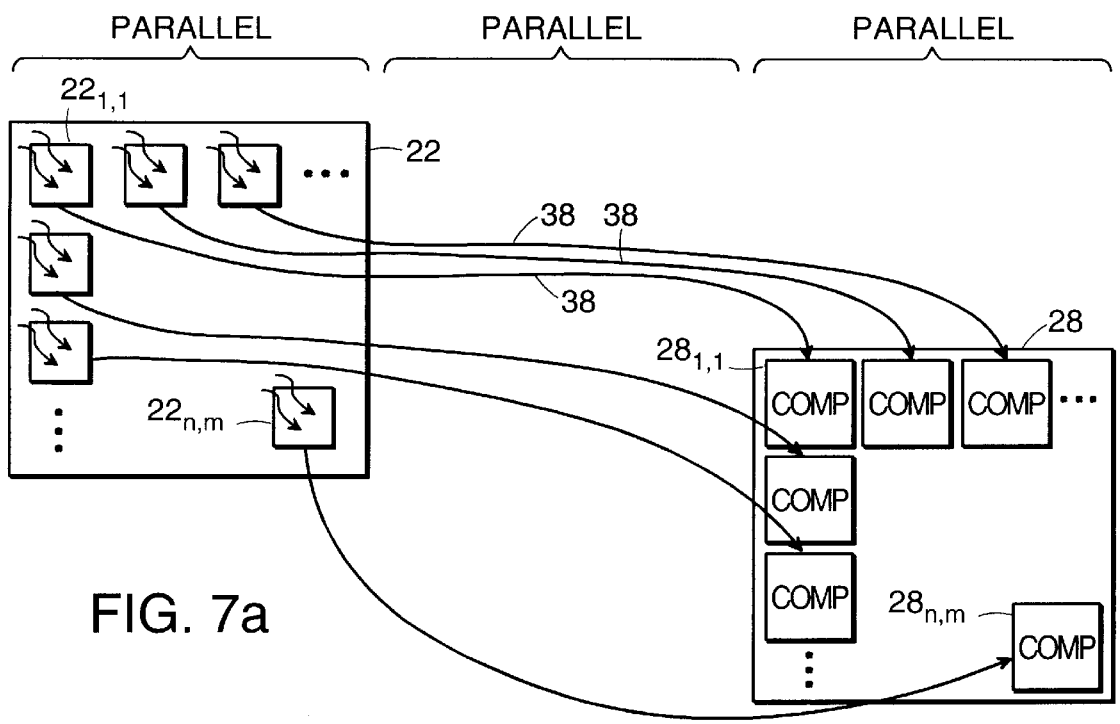
FIG. 7a is a block diagram of an alternate embodiment of a detector and processor arrangement including a multiprocessor for use with the systems of FIGS. 1 and 5.

Referring also to FIG. 7a, an alternate detector and processor arrangement is shown. In this embodiment, the processor 28 is a multiprocessor comprising a plurality of processors $28_{1,1}$ to $28_{n,m}$. Each of the photodetector elements $22_{1,1}$ to $22_{n,m}$ of the detector array 22 provides a respective output signal 38 to a corresponding one of the processors $28_{1,1}$ to $28_{n,m}$. With this arrangement, each of the processors $28_{1,1}$ to $28_{n,m}$ is able to operate substantially simultaneously, in order to provide substantial performance advantages. More particularly, each processor $28_{1,1}$ to $28_{n,m}$ in the multiprocessor unit 28 is responsible for making the z coordinate calculation based upon the data received from the corresponding element $22_{1,1}$ to $22_{n,m}$ of the photodetector array 22. Thus, the z coordinate for each location of the surface of the object 10 may be determined rapidly.

Figure 7B:
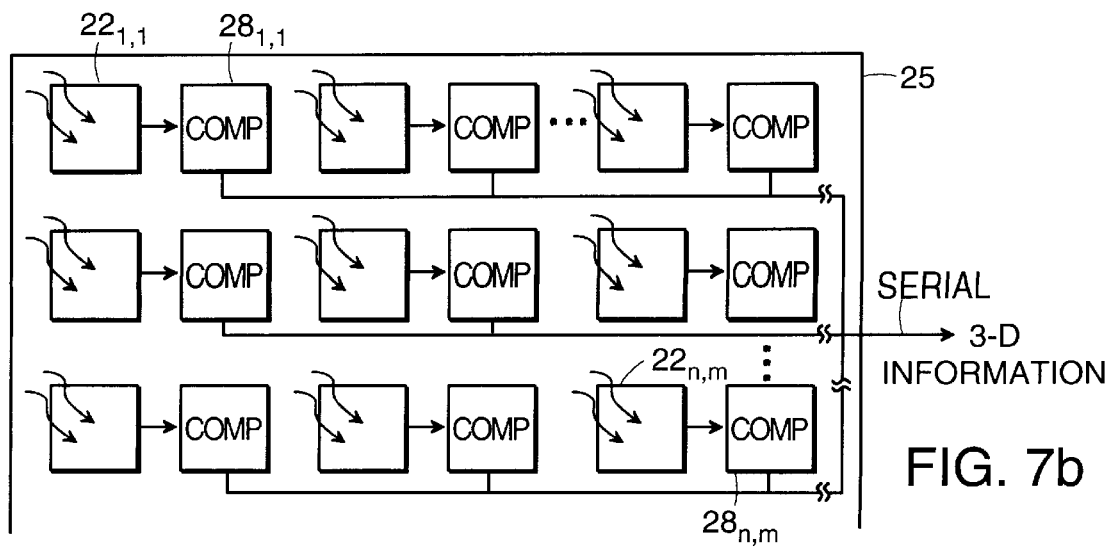
FIG. 7b is a block diagram of another alternate embodiment of a detector and processor arrangement for use in the systems of FIGS. 1 and 5.

FIG. 7b shows a further alternate embodiment of the detector and processor components for use in the systems of FIGS. 1 and 5 in the form of a unitary detector and processor array 25. The array 25 is fabricated on, and supported by, a common substrate or is fabricated as a Multi-Chip Module (MCM) or with Surface Mount Technology (SMT). The detector portion of the array 25 includes photodetector elements $22_{1,1}$ to $22_{n,m}$ and the multiprocessor portion of the array includes processors $28_{1,1}$ to $28_{n,m}$. More particularly, each of the detectors $22_{1,1}$ to $22_{n,m}$ is associated with, and positioned adjacent to, a respective one of the processors $28_{1,1}$ to $28_{n,m}$ and provides an input signal to the respective processor, as shown. The processors $28_{1,1}$ to $28_{n,m}$ process the information from the respective detectors $22_{1,1}$ to $22_{n,m}$ substantially simultaneously to provide the determined depth coordinates.

Figure 8:
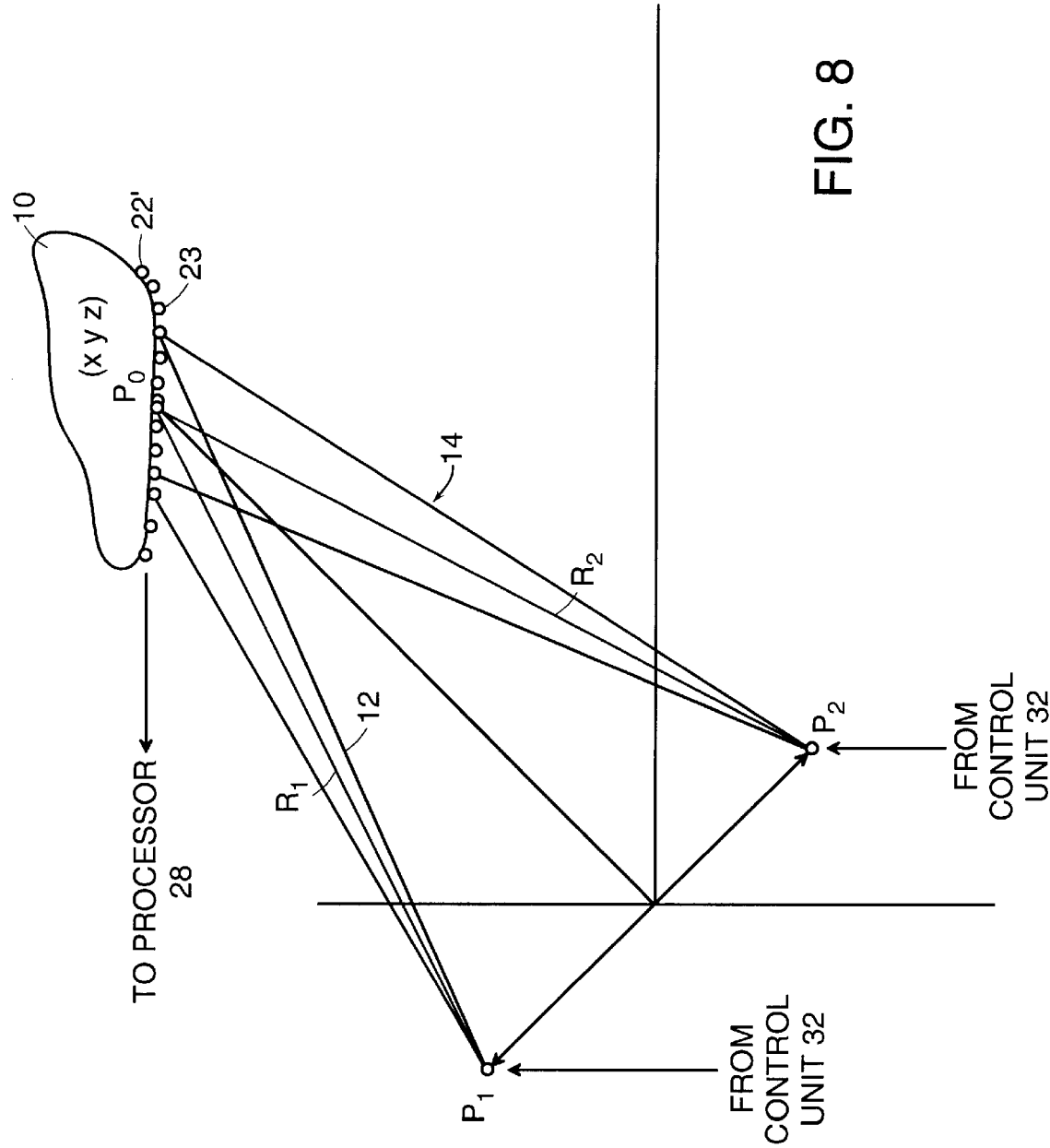
FIG. 8 is a block diagram of another embodiment of the invention for making surface contour measurements.

Referring to FIG. 8, another embodiment of the invention includes an array of detectors 22' placed against the surface of the object 10 whose surface contour is to be measured. With this arrangement, rather than observing the light scattered from the point $P_0$ on the surface of the object 10 to determine z, the measurement of the phase shifting of the light is performed directly at the surface of the object. Although not shown, the system of FIG. 8 includes a control unit 28 for controlling sources $P_1$ and $P_2$ and a processor 28 for processing radiation incident on detector 22' as shown and described above in conjunction with FIGS. 1, 5 and 6.

Figure 9:
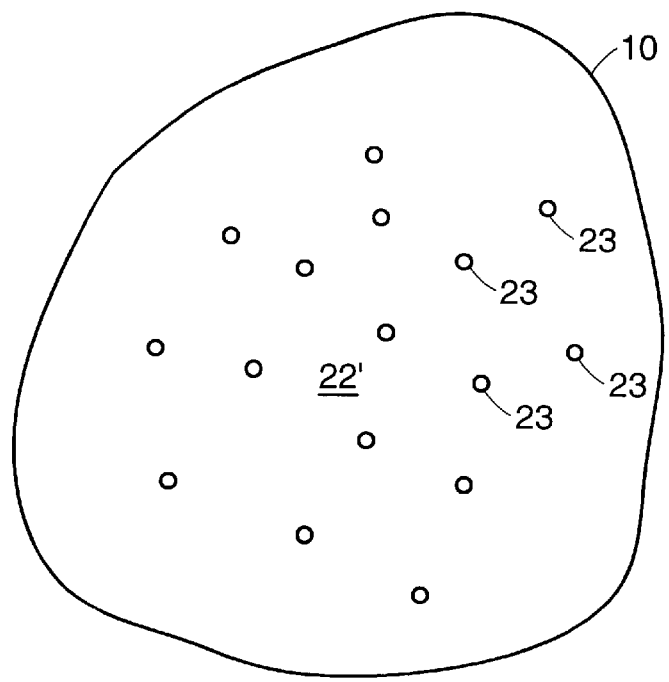
FIG. 9 shows one embodiment of photodetector elements positioned on the surface of an object in accordance with the embodiment of FIG. 8.

The arrangement and mechanism for locating the photodetector elements 23 on the surface of the object 10 may vary. In one embodiment shown in FIG. 9, a plurality of individual photodetector elements 23 of array 22' are positioned on the surface of the object 10 in the area of interest.

Figure 9A:
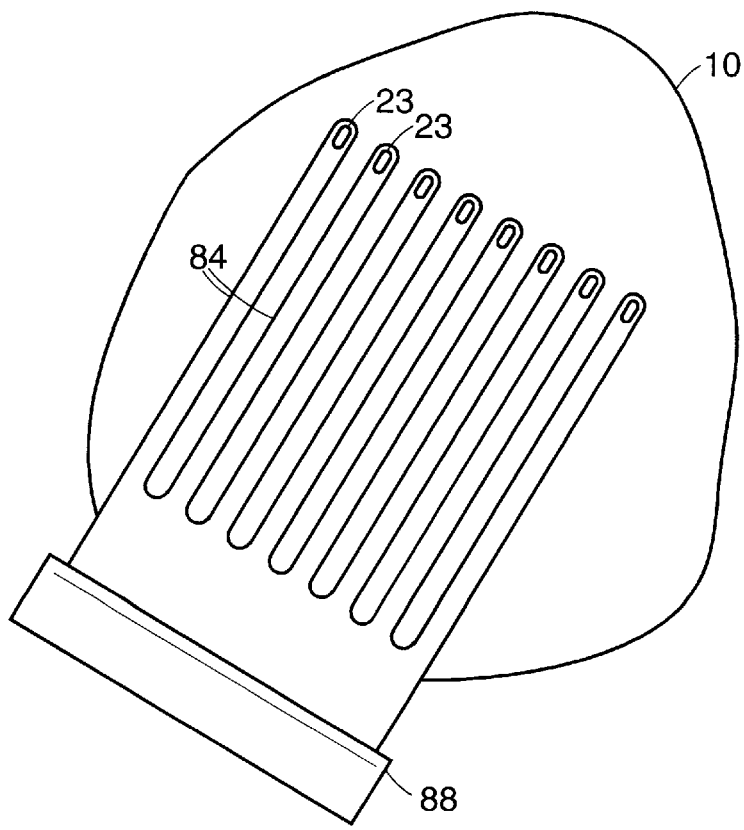
FIG. 9a shows another embodiment of photodetector elements positioned on spring arms for use in the embodiment of FIG. 8.

In another embodiment, shown in FIG. 9a, individual photodetector elements 23 of the array 22' are mounted on spring arms 84 cantilevered from a support and control unit 88. The spring arms 84 are moved over the surface of the object 10 by the control unit 88 in order to contact specific points, or regions of interest. The cantilevered support of spring arms 84 causes each individual detector 23 to remain in contact with a location on the surface of the object 10 as the arms 84 are moved thereover. That is, as the contour of the object surface varies, the spring arms 84 move up and down accordingly.

It will be appreciated that two or more additional radiation sources may be used in apparatus and methods of the present invention. For example, an additional source or sources can be used to determine x,y coordinate information regarding the object or a portion thereof. Additionally, extra radiation sources may be used to reduce any processing inaccuracies or ambiguities attributable to shadowing of a region of interest.

It will also be appreciated that other variations to the embodiment involving moving source points may be used. For example, the two points may both move with opposing motion, they may both move in the same direction with constant separation, they may rotate about a common center point, or motion may be simulated by using an array of source points that can be switched on and off by the control system.

Movement of both sources can provide advantages over a single moveable source such as reduction of the modulation nonuniformity in Eq. (38). A strategy for reducing this nonuniformity is to eliminate the linear term in Eq. (27) for r by moving the points in such a way that N is an odd function of a. Splitting the translation equally between the two sources so that their center remains fixed (referred to as opposing motion) results in the following expression:

$$N = \frac{R_2 - R_1}{\lambda} = \frac{1}{\lambda}\left[\sqrt{\left(x + \frac{a}{2}l_s\right)^2 + \left(y + \frac{a}{2}m_s\right)^2 + \left(z + \frac{a}{2}n_s\right)^2} - \sqrt{\left(x - \frac{a}{2}l_s\right)^2 + \left(y - \frac{a}{2}m_s\right)^2 + \left(z - \frac{a}{2}n_s\right)^2}\right] \quad (40)$$

The expansion of N corresponding to Eq.(16) that contains terms up to fourth order in a is:

$$N \approx \frac{a}{\lambda}\left[\cos\Psi - \frac{1}{8}\cos\Psi\sin^2\Psi \frac{a^2}{R_0^2}\right] \quad (41)$$

Thus, the second-order term in a and all higher-order even terms in a are eliminated and the magnitude of the third-order term is decreased by a factor of four.

An exact expression for z based on Eq.(17) and Eq. (22) is thus given by:

$$z = \frac{(xl_s + ym_s)n_s \pm \bar{\rho}\sqrt{(xl_s + ym_s)^2 - (\bar{\rho}^2 - n_s^2)[x^2 + y^2 + (a^2/4)(\bar{\rho}^2 - 1)]}}{\bar{\rho}^2 - n_s^2} \quad (42)$$

When $n_s=0$, Eq. (42) reduces to Eq. (21) with $$R_0 = \sqrt{\left(\frac{xl_s + ym_s}{\bar{\rho}}\right)^2 - \frac{a^2}{4}(\bar{\rho}^2 - 1)} \quad (43)$$

For small values of a, Eqs. (42) and (43) reduce to Eqs. (20) and (23), respectively. Elimination of the first-order dependence on a by moving both sources, however, makes this approximation more accurate than for a single moving source.

For opposing motion of two sources, the expression for the modulation rate given in Eq. (25) becomes:

$$\rho = \frac{1}{2}\frac{xl_s + ym_s + zn_s - \frac{a}{2}}{\sqrt{\left(x - \frac{a}{2}l_s\right)^2 + \left(y - \frac{a}{2}m_s\right)^2 + \left(z - \frac{a}{2}n_s\right)^2}} + \frac{1}{2}\frac{xl_s + ym_s + zn_s + \frac{a}{2}}{\sqrt{\left(x + \frac{a}{2}l_s\right)^2 + \left(y + \frac{a}{2}m_s\right)^2 + \left(z + \frac{a}{2}n_s\right)^2}} \quad (44)$$

Using a small a approximation that is valid up to and including third order of a, Eq. (44) becomes:

$$\rho \approx \cos\Psi - \frac{3}{8}\cos\Psi\sin^2\Psi \frac{a^2}{R_0^2} \quad (45)$$

In comparison with Eq. (27), the absence of the linear term in Eq. (45) results in an average oscillation rate r that remains more constant during a scan. The corresponding modulation nonuniformity $\chi$ previously defined in Eq. (37) can now be expressed as $$\chi \approx -\frac{3}{8}\sin^2\psi\frac{a^2}{R_0^2} \tag{46}$$

Eq. (46) yields a much smaller value for $\chi$ than Eq. (38) because of the second-order dependence on the ratio $a/R_0$ and because of the absence of $\cos\psi$ in the denominator. One of the advantages of moving both source points is that the nonuniformity remains small for the optimal range-resolution situation where $\psi=90°$.

The results for range uncertainty $\Delta z$ previously given for motion of a single source are based on the first term in the small-a approximations of N and $\rho$. Because the first terms in these approximations are identical for motion of two sources, the previously described results are also valid for the motion of two sources.

Figure 10:
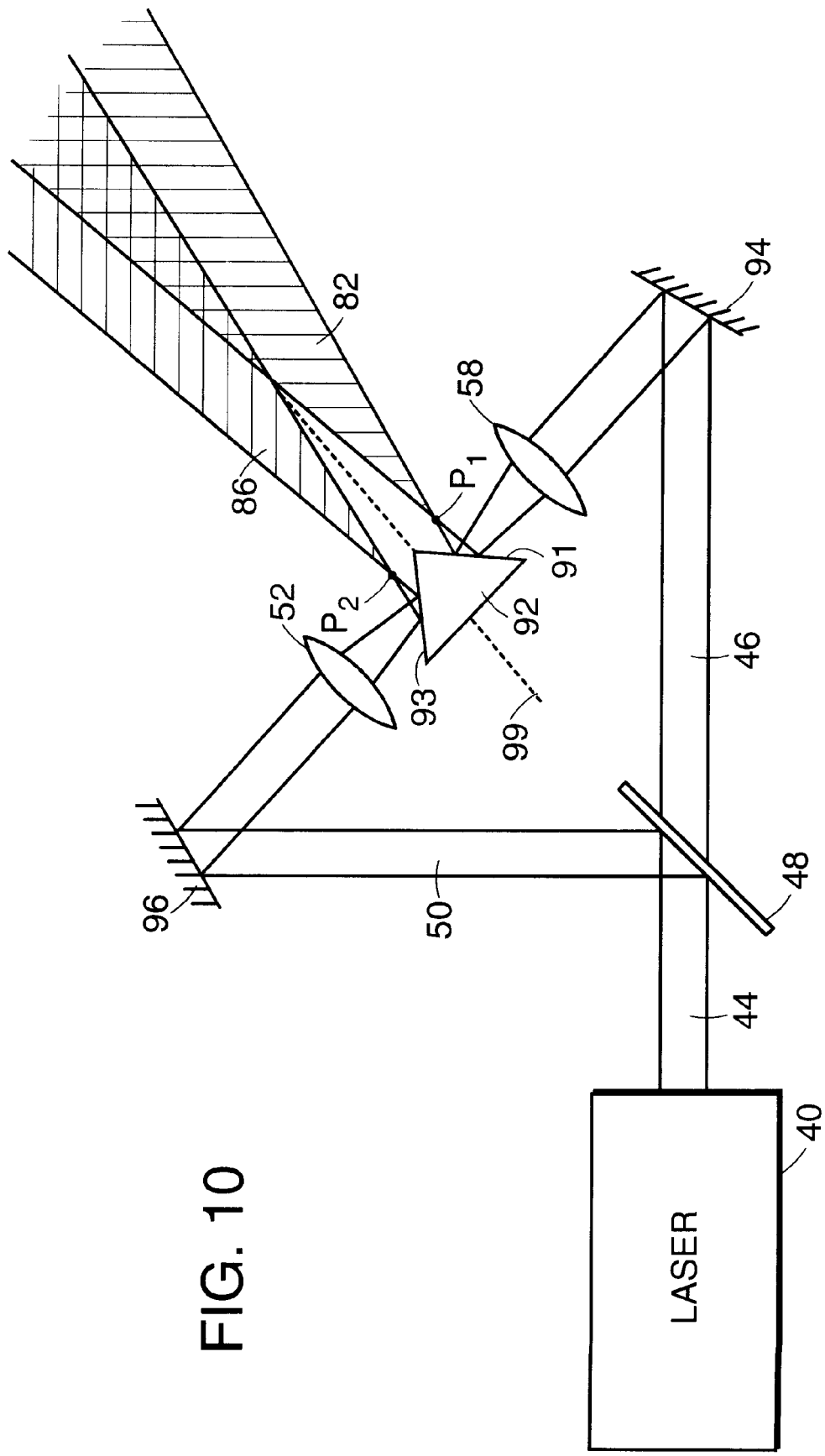
FIG. 10 is a block diagram of yet another embodiment of the two sources of radiation shown in FIG. 1.

Referring to FIG. 10, another embodiment of the present invention includes two oppositely moveable sources $P_1$ and $P_2$. A beam 44 from a laser source 40 is split into a transmitted beam 46 and a reflected beam 50 by beam splitter 48. The transmitted beam 46 is reflected from a mirror 94 to a lens 58. Similarly, the reflected beam 50 is reflected from a mirror 96 to a lens 52. A right angle prism 92 with mirrored surfaces 91 and 93 is used to redirect the beams 46 and 50 from the lenses 58 and 52, respectively. The beams 46 and 50 converge at points $P_1$ and $P_2$, respectively, and continue as divergent beams 82 and 86, respectively. Phase shifting can be accomplished by changing the optical path length difference between the beam paths followed by the separated beams 46 and 50. This can be achieved, for example, by inducing out-of-plane translations of at least one of the elements 48, 94, or 96 with a piezoelectric transducer (not shown). Alternately, a phase-shifting device (not shown) may be inserted in one of the beam paths 46 or 50. An example of such a device is a rotating glass disk that has been coated such that its optical thickness varies in discrete steps with rotation angle. Prism 92 is translatable along an axis 99 to affect a symmetric motion of the sources $P_1$ and $P_2$. Alternatively, the prism 92 can remain fixed while the laser 40, beamsplitter 48, mirrors 94 and 96 and lenses 52 and 58 are translated as one group along the axis 99 in order to cause a symmetric translation of the sources $P_1$ and $P_2$. Changing the separation of the sources $P_1$ and $P_2$ can also be accomplished using an angular modulation device (not shown) positioned in the beam 44 between the laser 40 and beam splitter 48 which causes a change in the beam angle. Examples of angular modulation devices are galvanometer mirrors and acousto-optic modulators.

In another embodiment (not shown), the sources $P_1$ and $P_2$ are virtual sources. That is, the sources $P_1$ and $P_2$ are not small sources of light or regions where the beams 46 and 50 pass through focus. Instead, diverging beams 82 and 86 are generated using optical components which cause the beams 46 and 50 to diverge (i.e. negative lenses). The resulting illumination at the object can be indistinguishable from other embodiments using real sources $P_1$ and $P_2$.

Figure 11:
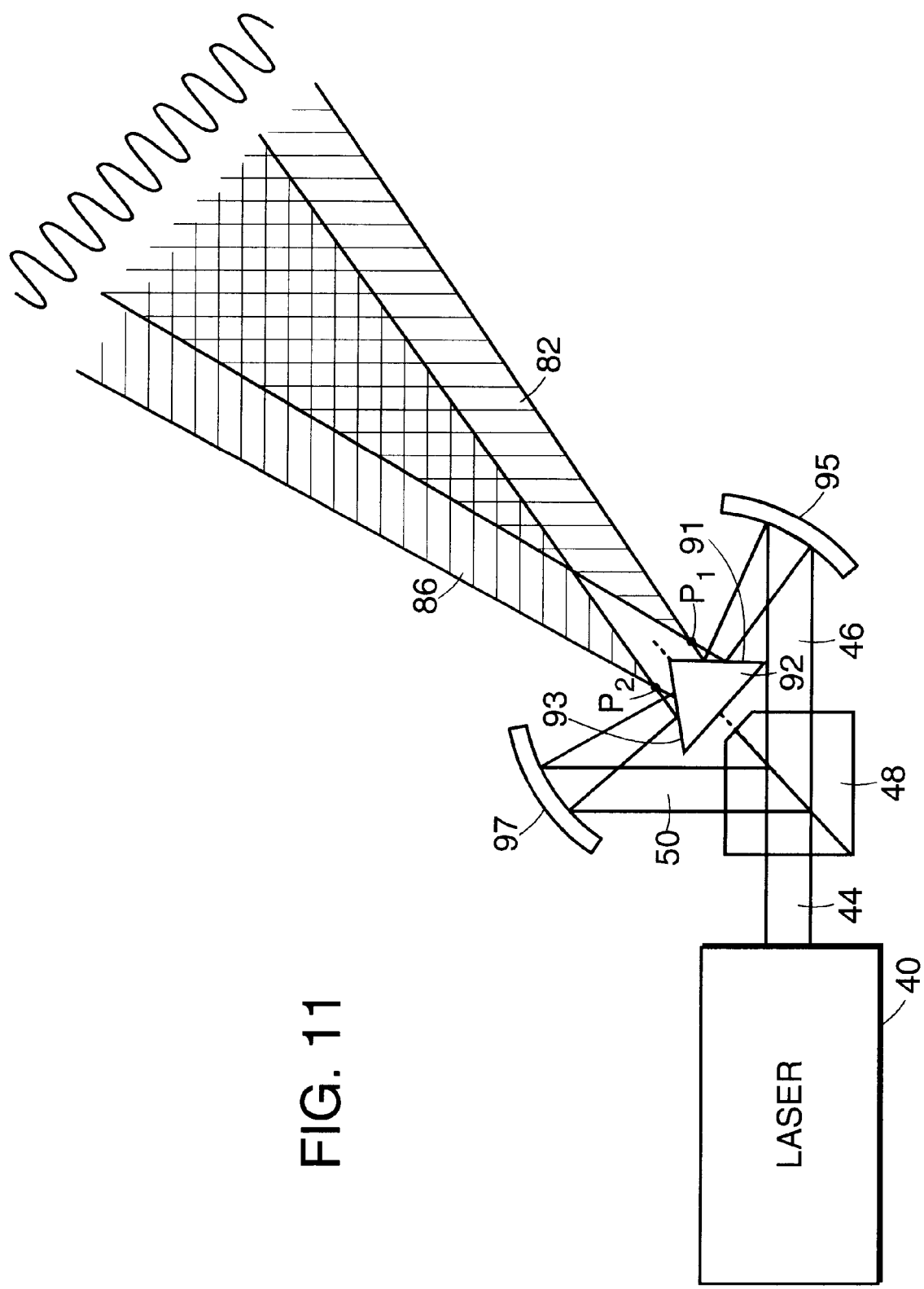
FIG. 11 is a block diagram of yet another embodiment of the two sources of radiation shown in FIG. 1.

FIG. 11 shows yet another configuration for generating oppositely moving sources $P_1$ and $P_2$. The beam 44 from a laser source 40 is split into a transmitted beam 46 and a reflected beam 50 by beam splitter cube 48. The transmitted beam 46 is reflected from a curved mirror 95 and from a mirrored surface 91 of a right angle prism 92. Similarly, the reflected beam 50 is reflected from a curved mirror 97 and from a mirrored surface 93 of the right angle prism 92. The beam splitter cube 48 can be modified (e.g., removal of glass outside the beam path) to permit close mounting of optical components. The curved mirrors 95,97 perform the functions of the flat mirrors 94,96 and lenses 58,52 in FIG. 10. The curved mirrors 95,97 can be off-axis parabolic mirror segments which yield small focal spots at $P_1$ and $P_2$. Alternatively, the curved mirrors 95,97 can be spherical elements. Aberrations caused by spherical elements will not affect the fringe contrast, but only the fringe position. These aberrations can be incorporated into the analysis. Phase shifting can be accomplished by translating beam splitter 48 or by placing a phase-shifting device (not shown) in one of the beam paths 46 or 50 as discussed previously.

In the prior description of FIG. 1, the derivation is based on a telecentric imaging configuration. The lateral position of the image point $P_i$ in the focal plane is related to the lateral position of the object point $P_0$ by the magnification of the lens 24 and is independent of the separation between the lens 24 and the object 10. Defocusing blurs the image $P_1$ but does not affect its apparent lateral position at the detector 22. Consequently, the lateral position of an object point $P_0$ can be estimated by the position of its image point $P_i$, regardless of the distance. Unfortunately, telecentric imagers 24 may be impractical for large objects because the lens 24 must be at least as large in diameter as the largest dimension of the measured object 10. Thus most lenses are not telecentric.

Figure 12:
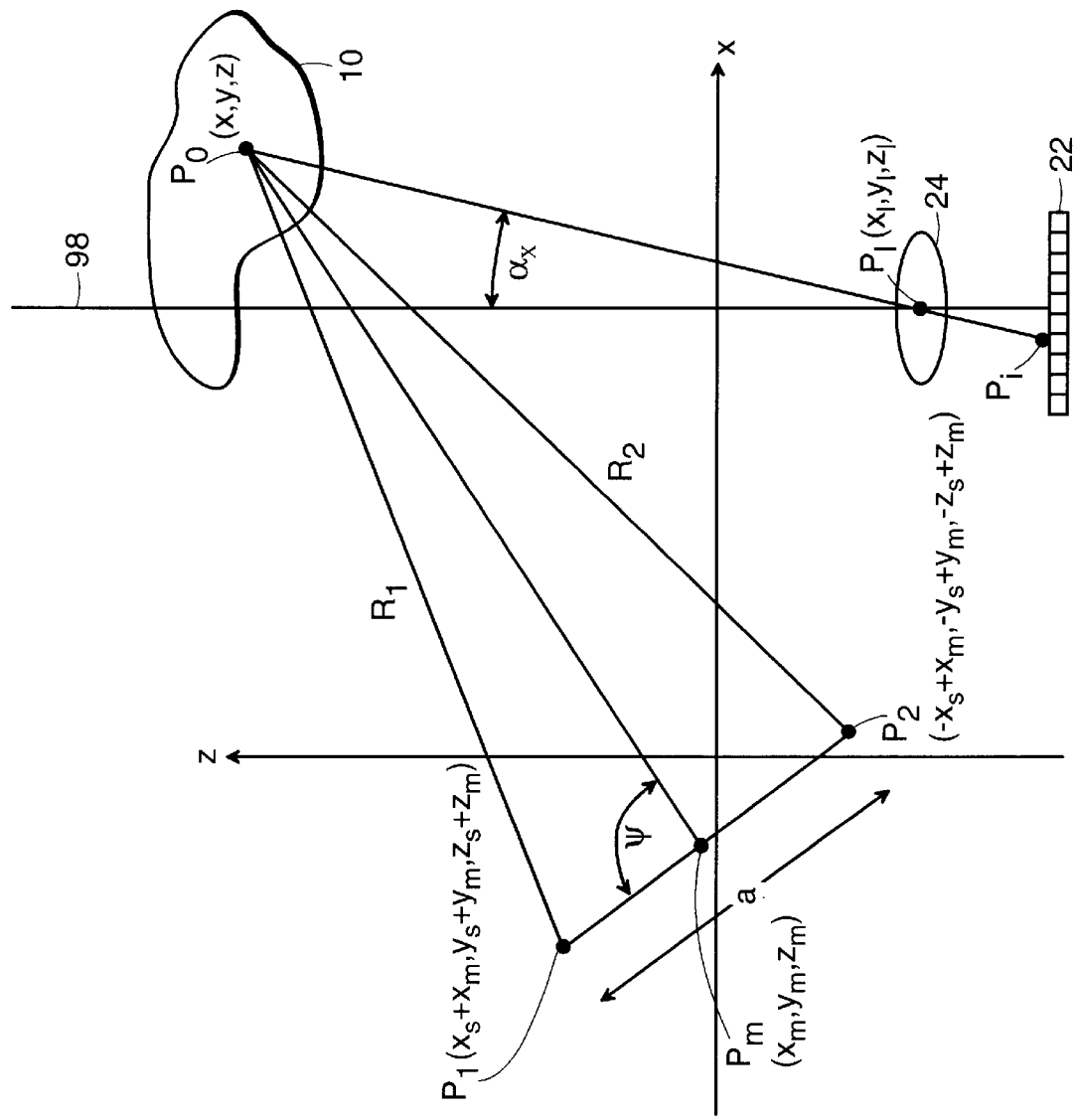
FIGS. 12 and 12A are block diagrams of the embodiment of FIG. 1.

Referring now to FIG. 12, a more general approach for determining the (x,y,z) coordinate of the point $P_0$ is to assume that the position of the image point $P_i$ at the detector 22 is a measure of the angle $\alpha$ between the object point $P_0$ and the optical axis 98 of the focusing element 24. The coordinate can be derived from the fringe number N and the location of the image point at the detector 22. The following equations are exact (do not assume small a). The lateral coordinates are given by:

$$x = x_f + (z - z_l)\tan\alpha_x \tag{47}$$

and $$y = y_f + (z - z_l)\tan\alpha_y \tag{48}$$

where $\alpha_x$ and $\alpha_y$ are the components of angle $\alpha$ as measured in the x-z and y-z planes, respectively.

The z coordinate is given by:

$$z = z_n + \frac{\overline{p}^2 B - B_s C_s \pm \overline{p}\sqrt{B_s^2 C - 2BB_s C_s + AC_s^2 + \overline{p}^2\left[B^2 - AC + \frac{a^2}{4}(\overline{p}^2 A - B_s^2)\right]}}{B_s^2 - \overline{p}^2 A} \tag{49}$$

where $$A = 1 + \tan^2\alpha_x + \tan^2\alpha_y \tag{50}$$

$$B = x_p\tan\alpha_x + y_p\tan\alpha_y \tag{51}$$

$$C = \frac{a^2}{4} + x_p^2 + y_p^2 \quad (52)$$

$$B_s = l_s \tan \alpha_x + m_s \tan \alpha_y + n_s \quad (53)$$

$$C_s = l_s x_p + m_s y_p \quad (54)$$

$$x_p = x_f - x_m - z_l \tan \alpha_x \quad (55)$$

and $$y_p = y_f - y_m - z_l \tan \alpha_y. \quad (56)$$

The coordinate $(x_m, y_m, z_m)$ represents the mid-position $P_m$ between points $P_1$ and $P_2$ and allows for a generalized solution with $(x_m, y_m, z_m)$ located at other than the origin of the coordinate system. For increased versatility, $P_m$ and other parameters may vary with time.

The generalized determination of object coordinates described above can be implemented in software on a computer which receives data from a processor unit in communication with a plurality of detectors 22 (e.g., a CCD array). Alternatively, the algorithm can be implemented directly in the processor unit 28.

The use of Eqs. (47)–(49) to determine the (x, y, z) coordinates of a point $P_0$ requires knowledge of the angles $\alpha_x$ and $\alpha_y$ in addition to the normalized fringe number $\bar{\rho}$. In the example above, these angles are determined by the location of the image point $P_i$ in the focal plane 22. In order to determine $\alpha_x$ and $\alpha_y$ accurately, it is necessary to correct for any image distortion that may occur in the lens 24. Distortion can be corrected, for example, by creating a distortion function that maps angles $\alpha_x$ and $\alpha_y$ onto image points $P_i$. The distortion map may vary for different lenses and may even vary slightly for the same lens 24 in different imaging configurations.

Figure 12A:
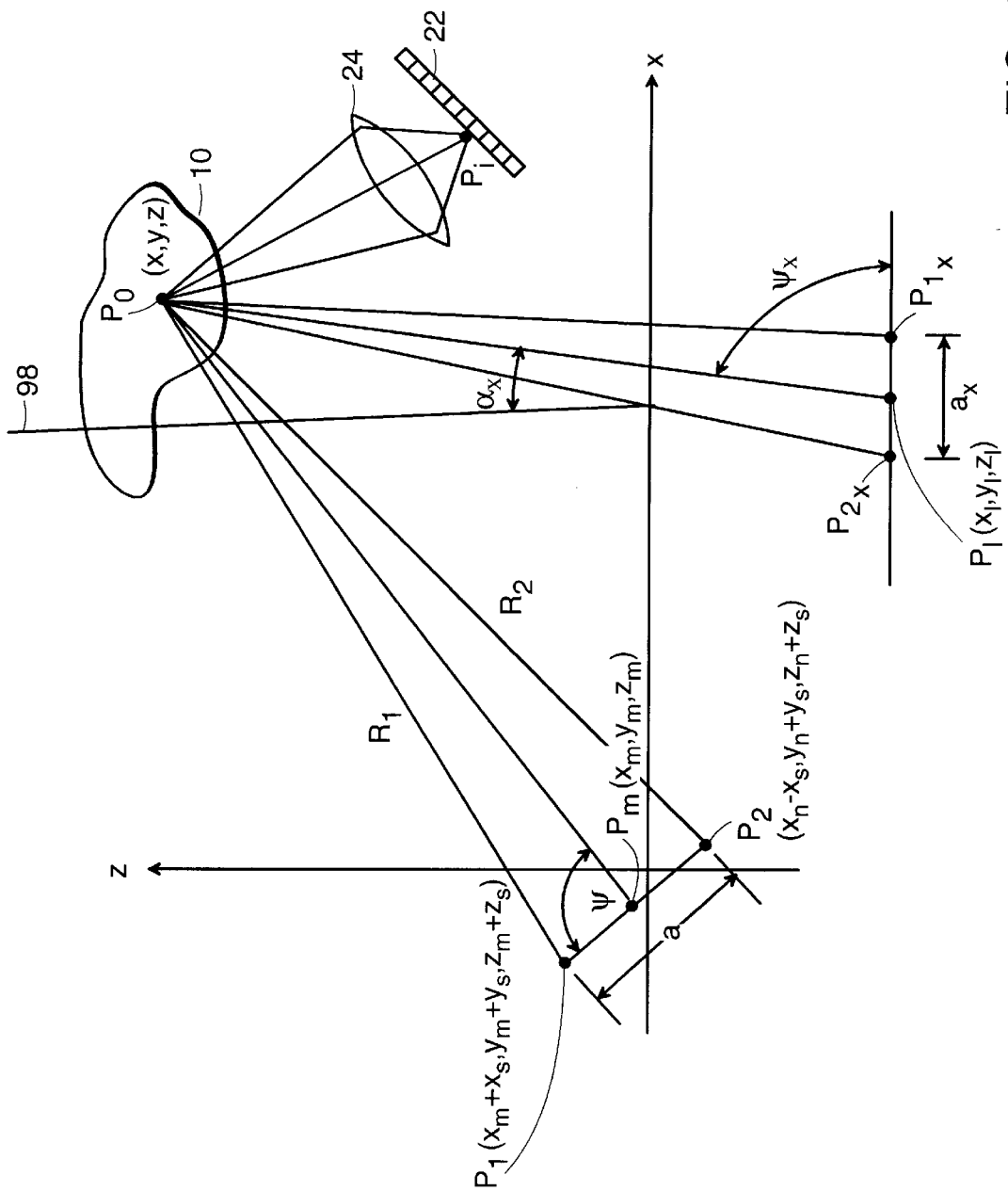

In another embodiment of the present invention, the inconvenience of characterizing lens distortion is avoided by using additional source heads to determine the remaining two direction components necessary for triangulation. For example, as depicted in FIG. 12a, an additional source head is placed at the position $P_1$ and the lens 24 which was previously at $P_0$ (see FIG. 12) is placed at any convenient position for viewing the region of interest on object 10. If the sources $P_{1x}$ and $P_{2x}$ in the second source head are oriented parallel to the x axis, then a measurement of the fringe number $N_x$ at point $P_0$ for this source head is equivalent to measuring the angle $\psi_x$ between the lines defined by points $P_{1x}$ and $P_1$ and points $P_1$ and $P_0$ (see Eq. (41)). The angle $\alpha_x$ required for Eqs. (47)–(49) is then determined from $\psi_x$ by the relationship $\alpha_x = \pi/2 - \psi_x$. Likewise, (not shown in FIG. 12a) the angle $\alpha_y$ can be determined by using a source head at position $P_1$ with sources $P_{1y}$ and $P_{2y}$ oriented parallel to the y axis. The fringe number $N_y$ for this orientation of a source head provides a measurement of the angle $\alpha_y$ through $\alpha_y = \pi/2 - \psi_y$. The source heads providing the angles $\alpha_x$ and $\alpha_y$ can, for example, be the same source head rotated 90° about the z axis or different source heads made to appear at the same location through use of a beam splitter.

When triangulating using multiple source heads, it is not necessary to know the location of lens 24 and detector 22 (or the location components of detectors 23 placed on the object 10). The purpose of the imaging system 22 and 24 (or detectors 23) is to observe the illumination intensity at $P_0$. Each pixel in the detector array 22 represents an observation point $P_0$. Consequently, an (x, y, z) coordinate may be determined for each pixel. Various approaches may be used to separate the measurements of N corresponding to different source heads. For example, the measurements may be time multiplexed by illuminating sequentially with different source heads or wavelength multiplexed by simultaneously illuminating with multiple source heads operating at different wavelengths. Measurements can be further distinguished through the use of polarization diversity.

To further elucidate the process of triangulation using multiple source heads, reference is made again to Eq. (41). For typical applications, a is small compared with $R_0$ and Eq. (41) can be simplified to $$N = \frac{a}{\lambda} \cos \Psi = \frac{a\nu}{c} \cos \Psi \quad (57)$$

The dependence on source spacing a and wavelength $\lambda$, or frequency $\nu$, is eliminated from Eq. (57) by writing N in terms of the normalized fringe number $\bar{\rho}$ using Eq. (19):

$$\bar{\rho} = \cos \Psi \quad (58)$$

Thus, the normalized fringe number corresponding to a particular source head is a direct measure of a component $\psi$ of direction from the mid-point $P_m$ of the source head to the observed point $P_0$. The three-dimensional coordinates of $P_0$ can be determined through triangulation given measurements from three or more source heads Suppose that source heads are located at the three positions $P_{m1}$, $P_{m2}$, and $P_{m3}$, and the orientations of the source pairs corresponding to each of these locations are given by the direction cosines $(l_{s1}, m_{s1}, n_{s1})$, $(l_{s2}, m_{s2}, n_{s2})$, $(l_{s3}, m_{s3}, n_{s3})$. In terms of Cartesian coordinates and direction cosines, Eq. (58) takes the form $$\bar{\rho}_i = \frac{l_{s_i}(x - x_{m_i}) + m_{s_i}(y - y_{m_i}) + n_{s_i}(z - z_{m_i})}{\sqrt{(x - x_{m_i})^2 + (y - y_{m_i})^2 + (z - z_{m_i})^2}} \quad (59)$$

where the subscript i distinguishes between source heads. Determination of $P_0$ coordinates (x, y, z) is achieved by measuring the normalized fringe numbers $\bar{\rho}_1$, $\bar{\rho}_2$ and, $\bar{\rho}_3$ for each source head and solving the set of three simultaneous equations represented by Eq. (59). The formalism of Eq. (59) is convenient because it handles generalized source-head placement and orientation in a compact form.

For those cases where the object point $P_0$ corresponding to a particular pixel 22 is not illuminated by three or more source heads, the missing direction information for that pixel 22 can be filled in by interpolating between the directions calculated for surrounding pixels 22. Furthermore, direction information obtained from multiple source heads can be combined with direction information obtained from pixel location to improve measurement quality.

The fact that multiple source heads makes it possible to determine $P_0$ without knowing receiver parameters (such as position, orientation, magnification, and distortion) makes it a simple matter to combine information from multiple imagers 22 and 24 (only one shown for clarity). This fact follows because the point clouds produced for each camera are already in the same coordinate system and do not need to be registered by going through a calibration procedure. Multiple imagers 22 and 24 can be positioned to view specific regions of interest at any desired view angle and lateral resolution. Thus, one imager 22 and 24 can give an overview of the entire object 10, and other imagers 22 and 24 can inspect regions of interest at high resolution.

In one of the above major classes of embodiments, the fringe number N at a point $P_0$ on the surface of the object 10 is determined by counting intensity-oscillations caused by motion of one or both of the sources $P_{1\ and\ P2}$. In its most rudimentary form, cycle counting requires sampling the intensity at least twice per cycle in order to keep track of the count. Also, to minimize cost, it may be desirable to count cycles using standard off-the-shelf components such as a charge-coupled device (CCD) connected to a frame grabber. Because the number of counts increases the farther a point $P_0$ in the image frame is from the N=0 position, it may be necessary to acquire and process hundreds of image frames using this approach.

The need for acquiring many image frames to determine N can be overcome by using a more sophisticated counting technique. This technique, denoted as progressive fringe division, takes advantage of the periodic and predictable nature of the intensity modulation. Thus, N can be determined by sampling the intensity modulation at a few discrete values of the source spacing a.

The explanation of progressive fringe division and its embodiment is aided by considering three facts. (For simplicity, opposing motion of the sources $P_1$ and $P_2$ is assumed in this discussion, although the following results can be formulated for other situations, including motion of only one source $P_1$ and stationary frequency-tuned sources.) First, the number of intensity oscillations N that occur at a point $P_0$ as the source spacing increases from an initial value of zero to the final value a is equal to the fringe number N at $P_0$ for the final value a. For example, if 10 were a simple object such as a plane, one could count N fringes on the surface of the object between the N=0 position (occurring at $R_1=R_2$) and the point $P_0$. The value of N includes partial cycles or fringes and thus is not necessarily a whole number.

This first fact can be further explained by noting that N can also be interpreted as the number of fringes that move past the point $P_0$ to be collected inside the region between $P_0$ and N=0 as the source spacing a increases from zero to its final value. In other words, when a=0 there are no fringes within this region, and the number of fringes contained inside this region increases by one every time a fringe moves across $P_0$. This correspondence between fringe number N and oscillation cycles is key to the robust three-dimensional imaging technique and makes it possible to determine N at an arbitrary point $P_0$ without making assumptions about the continuity of the surface surrounding the point $P_0$. Consequently, discontinuities in the surface such as holes and cliffs (i.e., edges) are handled without ambiguity.

The second fact is that N is directly proportional to the separation a according to Eq. 57. Consequently, it is not necessary to complete an entire scan with a running from zero to its final value to determine N(a). The value of N for a spacing $a_2$ can be estimated from its value at a spacing $a_1$ using the relationship $$N_{estimate}(a_2)=(a_2/a_1)N(a_1) \quad (60)$$

Likewise, $$N_{estimate}(a_2-a_1)=N(a_2)-N(a_1) \quad (61)$$

which states that knowledge of the value of N at two source spacings $a_1$ and $a_2$ can be used to estimate its value at the smaller difference spacing $a_2-a_1$.

The third fact is that a phase-shifting measurement can be made at any intermediate value of the source spacing a to provide a high-resolution map of the partial-cycle or "wrapped" component of the fringe number N at each measurement point $P_0$ within the field of view. In doing so, the wrapped component is calculated from the phase by $$N_{wrapped}=\phi/(2\pi) \quad (62)$$

and the phase is determined, for example, by Eq. (6). Thus, if $\phi$ ranges between $\pm\pi$, $N_{wrapped}$ ranges between $\pm 0.5$. Although a phase-shifting measurement can determine $N_{wrapped}$ to high precision, it leaves the integer-valued offset for N undetermined.

Because finer fringes represent a smaller variation in $\bar{\rho}$ per fringe, they can provide higher precision in the determination of $\bar{\rho}$ (assuming successful unwrapping). For example, finer fringes reduce the effect that phase-step errors have on the measurement. Finer fringes, however, also make it more difficult to perform the unwrapping because of the increased fringe density. The advantage of progressive fringe division is that it allows very fine fringes to be unwrapped correctly to achieve the highest possible resolution.

To implement progressive fringe division, wrapped cycle maps are produced for the imaged surface at each of a number of discrete source separations a. It is often sufficient to produce these cycle maps for three or fewer fringe sizes: coarse, medium, and fine. Successive unwrapped cycle maps are used in a bootstrapping operation to unwrap the next cycle map without introducing errors in the integer offset. The unwrapped cycle map corresponding to the finest fringe pattern provides the highest-resolution measurement.

Figure 13:
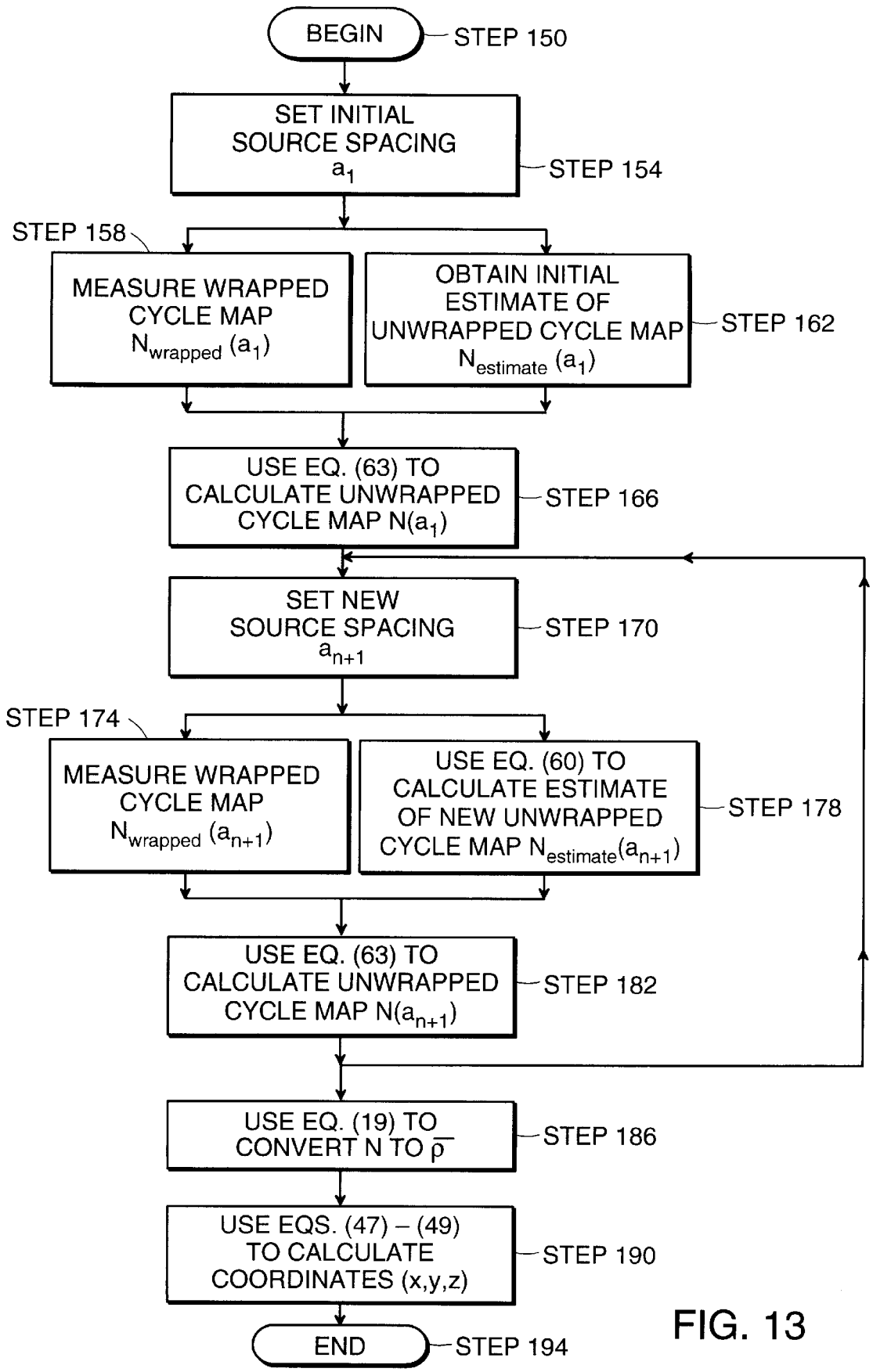
FIG. 13 is a flowchart of a series of steps used to perform progressive fringe division.

FIG. 13 depicts an illustrative series of steps used to execute progressive fringe division. The procedure begins (step 150) by setting the source spacing at an initial value $a_1$ (step 154). This value is normally the smallest in a series of source spacings and is chosen so as to produce a coarse fringe pattern on the object 10. A wrapped cycle map is then produced (step 158) by performing a phase-stepping measurement, as illustrated by Eq. (6). Step 158 is completed by converting phase to cycles by Eq. (62).

Next, (step 162) an initial unwrapped estimate of N for the coarse fringe pattern corresponding to $a_1$ is obtained. There are many approaches for producing this initial estimate. For example, $a_1$ can be made to be so small that the entire object falls within one fringe (e.g., $-0.5<N\leq-0.5$) this making unwrapping unnecessary. Alternately, a can be large enough to produce a small number of fringes across the object 10. Then a simple model (such as a linear ramp) for the variation of N over the field of view will suffice as an estimate for N as long as this estimate is accurate to within one-half of a cycle at all measurement points to be unwrapped. Another example of a method for obtaining the initial estimate is to assume a generic shape or an expected shape and to calculate N based on Eq. (40). Other examples are to use the result of a previous measurement on the same or a similar object 10, or to use cycle counting to partition the field of view into cycles. The number of frames necessary for cycle counting is small here because of the small number of fringes corresponding to $a_1$.

The purpose of the next step (step 166) is to unwrap the wrapped cycle map obtained from the measurement in step 158. If the unwrapped estimate from step 162 is accurate to within one-half of a cycle, unwrapping is achieved by use of the expression $$N(a)=N_{wrapped}(a)+\text{Round}[N_{estimate}(a)-N_{wrapped}(a)] \quad (63)$$

Note that the second of the two terms on the right-hand side of Eq. (63) is simply the integer offset required for unwrapping. Subtracting the wrapped measurement from the unwrapped estimate in this term produces a stair-step-like function whose value is approximately equal to the integer offset. Rounding to the nearest integer makes the expression exact, as long as the error falls within the one-half-cycle limits. Otherwise Eq. (63) introduces an integer offset error in N that may vary across the field of view.

The result of step 166 is an improved estimate of N for the smallest source spacing at. In order to further improve the quality of the measurement, a new source spacing $a_2$ is set in step 170 that produces a finer fringe pattern on the object 10. A new phase-stepping measurement is then completed in step 174 to yield a new wrapped cycle map corresponding to the finer fringe pattern. The unwrapping of this measurement requires a new unwrapped estimate corresponding to $a_2$. This estimate is obtained in step 178 by using Eq. (60) to scale the previous unwrapped estimate (obtained for the source spacing $a_1$ from step 166) into the appropriate range. Once scaling has taken place, the new wrapped cycle map from step 174 is unwrapped in step 182 by substituting it and the scaled estimate from step 178 into Eq. (63).

The result of the first pass through steps 170 through 182 is a refined estimate of N that corresponds to the larger source spacing $a_2$. Steps 170 through 182 can now be repeated with successively finer fringes (larger source spacings) until optimal $\bar{\rho}$ resolution is achieved. (Each time through the loop the source-spacing subscript is incremented by one.) Normally, optimal resolution is achieved in one to three iterations. Typically, the ratio between the new and old source spacings is of the order of ten. The maximum value this ratio can take is determined in practice by requiring that the error between the estimated and true value of N remains under the one-half cycle limit.

The loop represented by steps 170 through 182 in FIG. 13 is exited once the desired number of iterations has been completed. In step 186, N is converted to $\bar{\rho}$ through Eq. (19). If the objective of the measurement is to determine full three-dimensional coordinates, a triangulation takes place using, for example, Eqs. (47)–(49) or Eq. (59), to obtain coordinates for each measurement point (step 190). Step 194 represents the end of progressive fringe division. It should be appreciated that FIG. 13 is only an illustration of the procedure to be followed for progressive fringe division, and that the component steps can be executed in a number of different orders. For example, it may be desirable to collect all data before beginning the calculations.

The ability to produce fringes of widely varying size for use with progressive fringe division requires the source spacing to vary by the same ratio as the fringe spacing. A technique is now described for synthesizing a fringe pattern of a desired spacing from two other measurements. One advantage of this approach is that the two measurements used to synthesize the fringe pattern may be more readily obtainable.

Fringe synthesis is based on the following modification of Eq. (61):

$$N_{wrapped}(a_2-a_1)=[N_{wrapped}(a_2)-N_{wrapped}(a_1)]_{wrapped} \tag{64}$$

This result follows from wrapping both sides of Eq. (61) and observing that wrapping the difference $N(a_2)-N(a_1)$ on the right-hand side of Eq. (61) is equivalent to wrapping the difference $N_{wrapped}(a_2)-N_{wrapped}(a_1)$ of individually wrapped components. In other words the difference between the wrapped quantities within the square brackets in Eq. (64) ranges between ±1 and this difference must be wrapped to lie within the correct range of ±0.5.

Equation (64) provides a means for synthesizing phase-stepping measurements of wrapped N at a source spacing equal to the difference $a_2-a_1$ from individual phase-stepping measurements obtained at source spacings $a_1$ and $a_2$. This equation has a remarkable property for small values of $a_2-a_1$. Although the individual measurements from which the synthesized measurement is composed may be highly irregular and contain numerous discontinuities, the left-hand side of Eq. (64) can be smooth over the field of view, having only the number of wrapping discontinuities that correspond to the difference $a_2-a_1$. Thus fringe synthesis is an effective technique for producing an initial phase map for beginning progressive fringe division. Fringe synthesis can also be used, to synthesize any of the remaining unwrapped phase maps in the sequence to be used for progressive fringe division. If $\bar{\rho}$ is to be calculated from a synthesized cycle map, Eq. (19) is modified to read $$\bar{\rho} = \frac{\lambda N(\Delta a)}{\Delta a} \tag{65}$$

where $\Delta a$ represents the spacing difference between the two measurements.

Figure 13A:
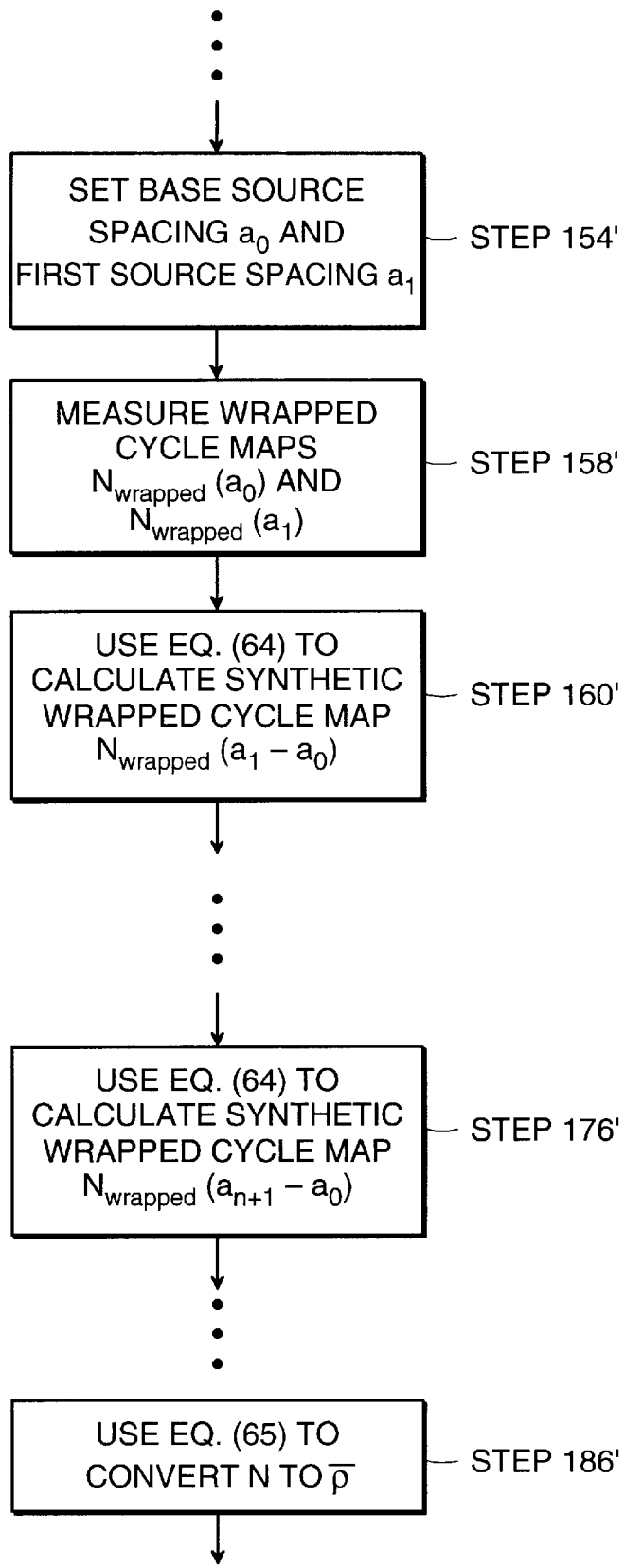
FIG. 13A is a flowchart of progressive fringe division utilizing fringe synthesis.

FIG. 13a illustrates one way that fringe synthesis can be incorporated into the progressive-fringe-division flow chart in FIG. 13. Step 154' is a modification of step 154 to include the selection of a base separation $a_0$ in addition to the separation $a_1$. Step 158' is a modification of step 158 to measure wrapped cycle maps at both separation values $a_0$ and $a_1$. Steps 160' and 176' are additional steps that are inserted to make use of Eq. (64) to synthesize the wrapped cycle map corresponding to the differences $a_n-a_0$. Step 186' is a modification of step 186 that allows $\bar{\rho}$ to be calculated from a synthesized cycle map using Eq. (65).

One of the advantages of fringe synthesis is that it may reduce the demands on a system for producing motion between sources $P_1$ and $P_2$. For example, a small incremental change from the widest source separation can produce fringes corresponding to a very small source separation. This approach not only reduces the travel requirement, but also overcomes some potential limitations of the source heads described in FIGS. 10 and 11. For example, with these source heads it is difficult to produce extremely small source separations, and fringes may become unstable due to vibrations when attempting to do so. Another advantage of fringe synthesis is that it may improve measurement repeatability and accuracy due to the fact that it is normally easier to repeat a constant difference between two source separations than it is to maintain an absolute source-spacing calibration.

Yet another advantage of fringe synthesis is that it minimizes errors of motion due to source-head misalignment. These motion errors may occur, for example, if the focal spots $P_1$ and $P_2$ in FIGS. 10 and 11 do not overlap for the nominal a=0 position. There are two types of misalignment to be considered. First, suppose that one of the focal spots $P_1$ is displaced out of the plane of the diagram with respect to the other $P_2$ by an amount d. Even though these two focal spots $P_1$ and $P_2$ each follow a straight-line trajectory and these trajectories can be parallel, the two spots miss by the distance d at their closest approach (i.e., the nominal a=0 position). As the spots $P_1$ and $P_2$ pass at closest approach, the orientation of the fringe pattern on the object 10 flips by 90° with respect to the nominal, or desired, orientation. Furthermore, the fringe spacing is never larger than that corresponding to a source separation d. (Alignment of the source head is facilitated by adjusting the displacement d until the fringes stay properly oriented near a=0.)

In the second type of misalignment, one of the focal spots $P_1$ is displaced along the direction of motion 99 with respect to the other focal spot $P_2$. This type of misalignment is caused by a sideways displacement of prism 92 (i.e., the displacement is perpendicular to axis 99 and is in the plane of FIGS. 10 and 11). At closest approach, one source $P_1$ lies directly behind the other source $P_2$, producing a circularly concentric fringe pattern on the object. As a increases, the fringes exhibit less curvature and approach their normal appearance. (Minimization of this source of error during source-head alignment is facilitated by adjusting the prism 92 sideways for small a to minimize fringe curvature.)

The difficulty that motion errors create for progressive fringe division is due to the resulting phase errors which are magnified when Eq. (60) is used to produce a scaled estimate of N. Motion errors limit the magnitude of the a ratio that can be used without introducing half-cycle errors in the estimate of N. Fringe synthesis overcomes this limitation because motion-induced phase errors are common to both measurements and cancel in the subtraction. Thus, even though the measurements may produce fringes that are distorted from the desired shape, the synthesized fringes are normal.

Cancellation of phase errors between the two beams with fringe synthesis has the additional advantage of automatically compensating for a global phase-offset error between the two beams. These phase-offset errors are introduced, for example, by a path-length difference $S_0$ between the two separated beams that is not an integer multiple of the wavelength $\lambda$. Phase offset errors cause the N=0 position to occur at a fringe phase of other than 0° (i.e., at other than an intensity maximum). These phase errors automatically cancel when performing fringe synthesis, making it unnecessary to calibrate the phase of the fringe pattern. Alternatively, phase calibration can be achieved by determining the precise N=0 position by fringe synthesis and adjusting the phase-shifting element for constructive interference at that point.

The cancellation of phase errors for synthesized fringes is important for the additional reason that it tends to cancel out wavefront errors in the illumination patterns falling on object 10 from the individual sources $P_1$ and $P_2$. Wavefront errors arise from the use of imperfect or extended sources and produce perturbations or ripples in the fringe pattern. These perturbations translate into small height errors in the measurement. Cancellation of wavefront errors occurs in fringe synthesis because these errors are largely independent of the distance between sources. Therefore, the error is common to the measurements taken at each source spacing and cancels due to the subtraction in Eq. (64). Fringe synthesis is an effective means for reducing errors due to illumination defects and can serve to decrease system cost by reducing requirements on the quality of the source-head optics.

Fringe synthesis allows progressive fringe division to be carried out with a reduced range of motion of the source points thus allowing a simpler source head design. Recall that in general, a source head provides two types of fringe modulation—a variation in fringe size and sideways motion of the fringe pattern arising from phase shifting. For a pure phase shift, the phase is changed without altering the position of the source. Another way of changing phase, however, is to move one source $P_1$ towards or away from the object relative to the other source $P_2$. Although doing so changes the location of the source $P_1$, this change is very small (less than a wavelength), and the resulting change in orientation of the source pair $P_1$ and $P_2$ is small if the sources are sufficiently far apart. Because the source separation can remain large for fringe synthesis, both types of modulation can be achieved through small motions of one or both source points $P_1$ and $P_2$. This reduced motion requirement allows simple source heads to be designed. For example, a source head might consist of the fiber-optic-splitter arrangement depicted in FIG. 2b. Phase shifting and variation in fringe size are accomplished by moving the end of one of the fibers in orthogonal directions.

Fringe synthesis has an important additional advantage of enabling progressive fringe division to be used for measurements based on laser-frequency tuning. Without fringe synthesis, application of progressive fringe division to the measurements would require an extremely high fractional tuning bandwidth in order to achieve the large variations in fringe size that are necessary for progressive fringe division. Fringe synthesis makes it possible to produce fringe-spacing variations that lie far outside the conventional tuning range. The tuning approach can provide measurements with very high repeatability and precision because of the fact that source motion is eliminated and frequency can be measured and controlled to high precision.

Application of progressive fringe division and fringe synthesis with frequency-tuning is explained with respect to Eq. (57). N has the same functional dependence on laser frequency v as it does on source spacing a. (It is assumed that the path-length difference represented by $S_0$ in Eq. (1) is zero, otherwise this offset must be accounted for in the equations.) Therefore, Eqs. (60), (63), and (64), which form the basis for progressive fringe division and fringe synthesis, also apply to frequency tuning if N is written as a function of frequency v. The expressions that govern frequency tuning are then $$N_{estimate}(v_2)=(v_2/v_1)N(v_1) \qquad (66)$$

$$N_{wrapped}(v_2-v_1)=[N_{wrapped}(v_2)-N_{wrapped}(v_1)]_{wrapped} \qquad (67)$$

and $$N(v)=N_{wrapped}(v)+\text{Round}[N_{estimate}(v)-N_{wrapped}(v)] \qquad (68)$$

Equations (19) and (65) also take the modified forms $$\bar{p} = \frac{c}{a}\frac{N(v)}{v} \qquad (69)$$

and $$\bar{p} = \frac{c}{a}\frac{N(\Delta v)}{\Delta v} \qquad (70)$$

respectively, where $\Delta v$ represents the difference frequency if N has been synthesized from two measurements.

Figure 14:
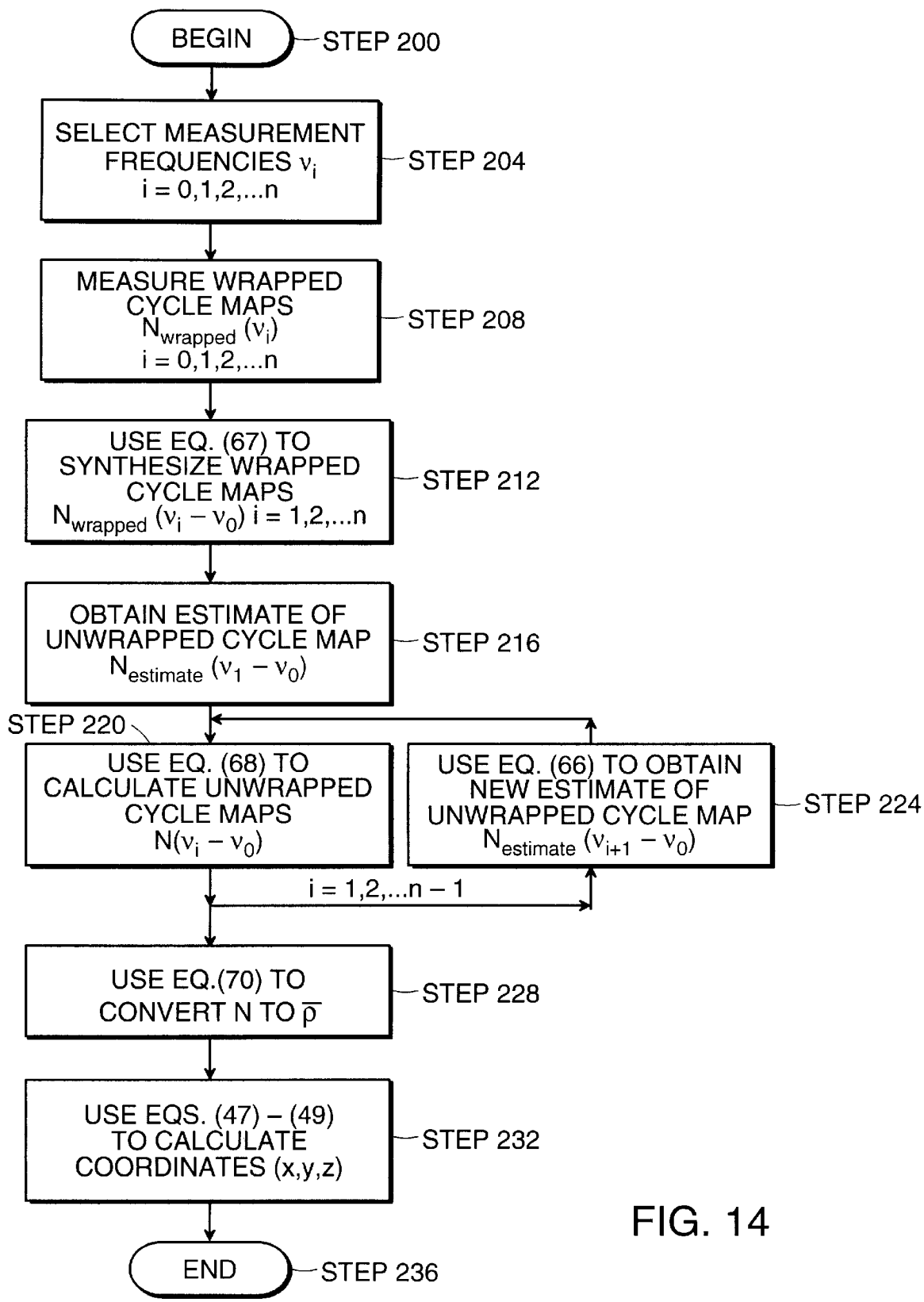
FIG. 14 is a flowchart of a method of progressive fringe division using fringe synthesis and frequency tuning.

FIG. 14 illustrates the steps to be followed for execution of progressive fringe division using fringe synthesis and frequency tuning. (Note that FIG. 14 also applies to progressive fringe division using fringe synthesis and source motion if v is replaced by a.) In this illustration, all data is collected at the beginning of the process. The procedure begins (step 200) by selecting the laser frequencies $v_0, v_1, \ldots v_n$ (step 204) to be used in the measurement of wrapped cycle maps $N_{wrapped}(v_0), N_{wrapped}(v_1), \ldots N_{wrapped}(v_n)$ (step 208). Equation (67) is then used to synthesize wrapped cycle maps for the difference frequencies $v_1-v_0, v_2-v_0, \ldots v_n-v_0$ (step 212). An estimate of the unwrapped cycle map is then obtained (step 216) for the first difference $v_1-v_0$ using one of many possible approaches (e.g., step 162 of FIG. 13). A preferred approach is to begin with a difference $v_1-v_0$ that is small enough so that $N(v_1-v_0)$ lies within the ±0.5-cycle limit. In step 220, Eq. (68) is used to calculate the unwrapped cycle map for the next larger difference $v_1-v_0$ in the series. This unwrapped cycle map is scaled using Eq. (66) in step 224 to be fed back into step 220 to unwrap the next synthesized cycle map in the series. The loop is exited after the cycle map corresponding to the final frequency difference $v_n$-$v_0$ has been unwrapped. In step 228, Eq. (70) is used to convert the final unwrapped cycle map N to fringe number $\overline{\rho}$. Equation (69) is used if the final cycle map N was not synthesized. In step 232 directional information corresponding to $\overline{\rho}$ is transformed into three-dimensional coordinates for each point of interest $P_0$ using, for example, Eqs. (47)–(49) or Eq. (59).

It should be appreciated that progressive fringe division and the combination of progressive fringe division with fringe synthesis are powerful general techniques for resolving counting ambiguities and refining counting estimates and that these techniques have applications beyond those described above. In particular, these techniques are not limited to the above methods and apparatus for acquiring data or even to the analysis of fringes.

Figures 14A, 15:
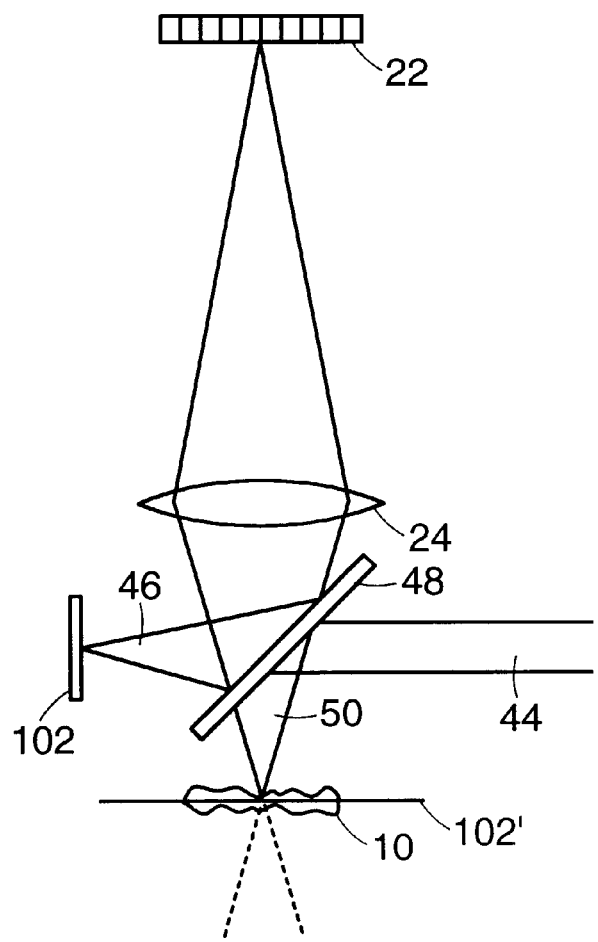
FIG. 14A illustrates an embodiment of the method of FIG. 14.
FIG. 15 illustrates another embodiment of the method of FIG. 14.

With reference to FIG. 15, a variation is now described that utilizes the progressive-fringe-division and fringe-synthesis techniques on unresolved fringes, or image speckle. In this figure, laser beam 44 is incident on beam splitter 48 which splits beam 44 into beams 46 and 50. Beam 50 reflects off beam splitter 48 and illuminates a region of interest on object 10. Beam 46 passes through beam splitter 48 and illuminates reference surface 102. Light reflected off of object 10 and reference surface 102 is recombined by beam splitter 48 and passes through lens 24 which produces a speckled image on detector array 22. Phase shifting is accomplished by inserting a phase-shifting element (not shown) in one of the separated beam paths. The frequency of laser beam 44 is variable or can be switched between two or more discrete values. Path length differences due to a difference in height z between object 10 and virtual image 102' produce a modulation of speckle intensity that changes with laser frequency. The phase of the modulation at a particular laser frequency can be determined accurately through phase-shifting measurements.

There are no fringes produced on the surface of object 10 in FIG. 15 because the object 10 is illuminated by only one laser beam 50. Interference occurs at the detector 22 because of the coherent superposition of light from the two beams 46 and 50. In accordance with Eqs. (1)–(5), varying the laser frequency causes the individual speckle lobes in the image of the object 10 to oscillate in intensity at a rate that is proportional to the path length difference s. For simplicity, assume that the reference surface 102 is flat and lies in the x-y plane. Let z represent the height above the virtual reference surface 102' of the point $P_0$ on object 10 to be measured. Nominally, s=2z (due to round-trip propagation) and z can be calculated from N by $$z = \frac{c}{2} \frac{N(v_n - v_0)}{v_n - v_0} \tag{71}$$

if N is obtained through fringe synthesis, and by $$z = \frac{c}{2} \frac{N(v_n)}{v_n} \tag{72}$$

otherwise.

The procedure for producing three-dimensional images using FIG. 15 is the same as that outlined in FIG. 14, with the exception (see FIG. 14a), that step 232 is replaced by step 232'. In step 232', Eq. (71), or Eq. (72), is used to convert N to z. The approach depicted in FIG. 15 does not rely upon triangulation. Consequently, it has the advantage that shadowing effects between source $P_1$ and $P_2$ and receiver 22 and 24 can be eliminated. This approach is particularly useful for shorter-range applications, including three-dimensional microscopy, where the separated path lengths remain small.

The above embodiments are based on interference using coherent illumination. Those embodiments that use a lens 24 to form an image of the object 10 on a detector 22 have the potential disadvantage that the resulting image is speckled and that speckle can limit range resolution. It should be noted that detectors 23 placed directly on the surface of the object do not suffer from this limitation. Speckle occurs for imaging with coherent illumination because the finite point-spread function of the lens 24 allows light scattered from regions surrounding $P_0$ on the surface of object 10 to interfere at point $P_i$ at detector 22. The average speckle size at the detector plane is determined by the size of the point-spread function of the lens. Speckle can cause a measurement of $\overline{\rho}$ to be drawn to one side or the other by scattering regions surrounding $P_0$ whose contributions can phase up constructively at the image point $P_i$.

A number of techniques are now presented for mitigating the effects of speckle on a measurement. In practice, speckle effects tend to average out if many speckle lobes fall within the area corresponding to a single pixel of the detector array 22. One way of satisfying this condition is to require that the interference fringes are resolved by lens 24 and that the point-spread function of lens 24 is small enough to cause many speckles to fall on each element of detector array 22. This approach works well in situations that do not require the ultimate lateral resolution. Generally, lateral resolution is traded off for speckle averaging.

In situations requiring high lateral resolution, it can be necessary to more closely match speckle size and pixel size. In general it is desirable to reduce the magnitude of the side lobes of the point-spread function of the lens (i.e., to apodize). Doing so reduces the ability of a scattering region that would otherwise be contained within a strong side lobe of the point-spread function to bias the measurement of $\overline{\rho}$. Apodization can result in a slightly degraded lateral resolution. In some instances, it can be advantageous to trade off this lateral resolution for improved range resolution.

An additional technique for mitigating speckle effects is to minimize the variation of $\overline{\rho}$ over the region of the surface of object 10 corresponding to an individual pixel 22. For example, increasing the pixel density while maintaining a constant ratio of speckles per pixel 22 decreases the change in $\overline{\rho}$ from one side of the region corresponding to the pixel 22 to the other and improves both range resolution and lateral resolution.

For a given optical configuration and pixel density, the variation of $\overline{\rho}$ over individual pixels 22 can be minimized by making an appropriate choice of the position and orientation of the source head. Variation of $\overline{\rho}$ is minimized, for example, if the surface element corresponding to a pixel 22 lies along an equiphase surface of the three-dimensional fringe pattern. In other words, speckle effects are minimized if the surface being measured is parallel (or nearly parallel) to a surface of constant phase for the illuminating fringe pattern. This condition can be achieved by using grazing incidence with the vector representing the orientation of the two source points being parallel to the surface normal. Except for specialized cases, it is impossible to satisfy this condition for every point $P_0$ on the surface. The condition can be approximated, however, for many objects of practical importance, including, for example, aerodynamic surfaces such as auto-body and airframe panels.

Many objects have a broad range of surface slopes and orientations, making it impossible to satisfy the above condition for minimizing $\bar{\rho}$ over the entire surface using a single source head. In these situations, this condition can be better satisfied through the use of multiple source heads that are positioned such that one of them is responsive to each major region of the object 10, or to those regions of greatest interest. It is assumed that some form of multiplexing takes place to distinguish which information comes from each source head. If more than one source head illuminates the same region, the resulting measurements can be weighted according to the level of speckle noise expected in each measurement for that region. Multiple source heads can also help to overcome shadowing limitations. Information from multiple source heads can be readily combined for a given detector 22 that views a region of overlap. Registration is automatic because the angular information corresponding to each pixel is the same for each source head.

In some instances, it is not possible to illuminate certain regions of an object 10 in a way that satisfies the condition for minimizing the variation of $\bar{\rho}$ over a pixel. An additional technique for mitigating speckle effects that is not affected by this limitation is based on speckle averaging. Speckle averaging can be achieved by making additional measurements with slightly different parameters (e.g., variations in the optical configurations). Alternatively, the parameters can be varied during the exposure. Averaging effectively reduces speckle effects if the set of parameters being varied changes enough to produce different statistical realizations of the speckle pattern.

In one embodiment, the mid-position $P_m$ between sources is the adjusted parameter. If the direction of displacement of $P_m$ is out of the plane of FIGS. 1 and 12, then variations of object illumination will be minimized. Variations of $P_m$ are explicitly accounted for in Eqs. (47)–(56) and (59). Reduction of speckle effects can be achieved, for example, by averaging the individual measurements of (x, y, z) coordinates for different values of $P_m$.

In another embodiment, the source separation a and the laser frequency ν vary simultaneously during the exposure time such that the fringe pattern remains stationary. The condition for the fringes to remain stationary is seen by inspection of Eq (57) to be that the ratio a/λ (or the product a ν) remains constant. To achieve stationary fringes, the motion of the point sources $P_1$ and $P_2$ can be slaved to the tuning of the laser 40, or vice versa, by a feedback mechanism such as a fringe monitor. The fringe monitor may consist of discrete detectors or a linear array of detectors that is incorporated into the source head and measures a fringe pattern that is separated from the main beam by a beam splitter.

For speckle averaging to be effective, the tuning excursion used is large enough to cause a number of decorrelation cycles to occur in the image speckle. Care should be taken to minimize the path-length offset $S_0$ between the separated paths in the source head. Otherwise, the phase of the fringe pattern will vary with frequency shift Δν by the expression $$\Delta\phi = 2\pi \frac{\Delta\nu S_0}{c} \qquad (73)$$

Alternatively, the path-length offset can intentionally be set to a nonzero value and the fringe pattern "strobed" at 2 π increments of the phase Δφ to freeze the phase of the fringe. Different phase shifts could then be achieved by varying the strobe timing.

It will be appreciated that cycle counting, progressive fringe division, and progressive fringe division using fringe synthesis are general techniques for resolving counting ambiguities and increasing measurement precision, and that their usefulness goes far beyond the applications described above. Furthermore these techniques can be applied to generalized signals (including one-dimensional signals) and are not limited to sinusoidal variations.

It should also be appreciated that these techniques apply to general structured-light patterns formed by arbitrary means. Examples of means for producing structured light patterns are the interference or diffraction of coherent radiation, the "white-light" superposition of interference or diffraction patterns formed at different wavelengths, and the imaging of patterns onto the object with a lens using either coherent or incoherent radiation. As an example of the imaging approach, a white-light pattern produced by a digital projector can be made to expand and contract to produce accordion motion and to translate sideways to produce phase modulation. Although projecting white-light patterns onto the surface in this manner may eliminate speckle effects, this approach has certain disadvantages. With an imaged light pattern, there is a limit to how small the fringe period may be. It is also necessary to consider the depth of field of the projected pattern. It may not be possible to project a fine fringe pattern from an oblique angle that is in focus over the entire object. On the other hand, fringes produced by interference or diffraction are always "in focus" on the object surface, no matter what the distance to the observation point or the size of the fringes.

A further embodiment of the invention maintains the advantages of forming fringes by interference or diffraction and eliminates speckle effects by forming these fringes in broad-band illumination or white light. This embodiment is based on the incoherent superposition of interference-fringe intensities formed at different component wavelengths in the illumination spectrum. If these fringes have the same size and shape, the interference-fringe intensities corresponding to different wavelengths reinforce each other at every point in the pattern.

By reference to Eq. (57), fringes of the same size and shape are produced by fixing the ratio a/λ. This objective can be achieved simultaneously for each component wavelength by using a diffraction grating followed by a lens. For small diffraction angles, the angular deviation of the first-order beam diffracted by the grating is proportional to the wavelength of that beam. (Using a Bragg grating improves efficiency by directing a high fraction of the incident power into the first-order beam.) The lens converts this angular deviation into a displacement of the source $P_1$ or $P_2$ that is also proportional to λ, thus making it possible to maintain a constant a/λ ratio. In this embodiment, the location of source $P_1$ or $P_2$ is smeared out in wavelength. White-light phase shifting can be achieved by translating the grating sideways or through the use of a white-light phase shifter, based on, for example, the Pancharatnam phase.

There are many possible optical arrangements for implementing a source head based on these principles. In one arrangement, Bragg gratings are placed in beams 46 and 50 in FIG. 10. The gratings (not shown) and prism 92 are positioned such that the two focal spots corresponding to the undiffracted beams overlap and the first-order beams are deviated towards the base of prism 92. This arrangement causes the source separation a corresponding to the diffracted beams to be proportional to the optical wavelength λ. White-light phase shifting is achieved by translating one of the Bragg gratings laterally. Variation of fringe size is achieved by changing the period of the grating. In one embodiment, the grating period is changed electronically using a Bragg cell, or acousto-optic modulator. In this embodiment, both Bragg cells are driven at the same frequency and phase shifting is accomplished by shifting the phase of one drive signal with respect to the other. (The fringes are stationary because each beam suffers the same Doppler shift.) In another embodiment, Bragg gratings of different periods are moved into place sequentially. In yet another embodiment, a single diffractive element is placed in beam 44. A separate white-light phase shifter (not shown) is placed in one of the beams 46 or 50. In some embodiments of a white-light phase shifter known to those skilled in the art, beam splitter 48 is a polarizing beam splitter.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for determining, on an object having a surface, three-dimensional position information of a point on said surface of said object, said method comprising the steps of:
    providing two sources of radiation separated by a distance, said sources being coherent with respect to one another;
    illuminating said point on said surface of said object with said radiation from each of said sources;
    moving each of said sources relative to each other;
    detecting radiation scattered by said point on said surface of said object; and
    calculating position information in response to said movement of said sources and said detected radiation scattered by said point on said surface of said object.

2. The method of claim 1 further comprising the step of changing the phase of said radiation from one of said sources relative to the phase of said radiation from the other of said sources as measured at said point on said surface of said object.

3. The method of claim 1 wherein said sources of radiation are virtual sources of radiation.

4. The method of claim 1 wherein the step of moving each of said sources comprises changing said distance between said sources.

5. The method of claim 1 wherein said distance comprises a midpoint equidistant from each of said sources and wherein the step of moving each of said sources comprises changing said distance and keeping said midpoint fixed.

6. An apparatus for determining, on an object having a surface, position information of a point on said surface of said object, said apparatus comprising:
    two sources of radiation separated by a distance, said sources being coherent with respect to one another;
    a control system moving each of said sources relative to each other;
    a detector positioned to receive radiation scattered from said point on said surface of said object; and
    a processor receiving signals from said detector, said processor calculating position information in response to said movement of said sources and said received radiation scattered from said point on said surface of said object.

7. The apparatus of claim 6 wherein said control system changes the phase of at least one of said sources of radiation relative to the phase of said radiation from the other of said sources as measured at said point on said surface of said object.

8. The method of claim 6 wherein said sources of radiation are virtual sources of radiation.

9. The apparatus of claim 6 wherein said control system moves each of said sources relative to each other to change said distance.

10. The apparatus of claim 6 wherein said distance comprises a midpoint equidistant from each of said sources and said control system moves each of said sources relative to each other to change said distance and keep said midpoint fixed.

11. The apparatus of claim 6 further comprising an imaging system positioned between said detector and said point on said surface of said object, said imaging system imaging said point on said detector.

12. The apparatus of claim 11 further wherein said imaging system comprises a lens.

13. The apparatus of claim 12 wherein said lens comprises a telecentric lens.

14. The apparatus of claim 6 wherein said detector comprises a plurality of photodetectors.

15. The apparatus of claim 14 wherein said processor comprises a multiprocessor system having a plurality of processing units and each of said plurality of photodetectors is in electrical communication with a respective one of said plurality of processing units.

16. The apparatus of claim 6 wherein said two sources of coherent radiation comprises a source providing a beam of coherent radiation and a beam splitter positioned to divide said beam of coherent radiation into two beams of coherent radiation.

17. The apparatus of claim 16 further comprising a first mirror and a second mirror, said first mirror positioned to reflect a first beam of radiation from said beam splitter and said second mirror positioned to reflect a second beam of radiation from said beam splitter.

18. The apparatus of claim 17 further comprising a first focusing element and a second focusing element positioned in said first beam of radiation and said second beam of radiation, respectively, after reflection from said first mirror and said second mirror, respectively.

19. The apparatus of claim 17 wherein said first mirror and said second mirror are focusing elements.

20. The apparatus of claim 17 further comprising a first reflecting surface and a second reflecting surface wherein said first beam of radiation reflected from said first mirror is reflected from said first reflecting surface and said second beam of radiation reflected from said second mirror is reflected from said second reflecting surface,
    wherein the relative movement of said first reflecting surface and said second reflecting surface with respect to said sources generates an apparent change in source position for each of said sources.

21. The apparatus of claim 20 wherein said first reflecting surface is coupled to said second reflecting surface.

22. A method for determining, on an object having a surface, position information of a point on said surface of said object, said method comprising the steps of:
    providing two sources of radiation separated by a distance, said sources being coherent with respect to one another;
    providing a detector at said point on said surface;
    illuminating said point on said surface of said object with said radiation from each of said sources;

moving each of said sources relative to each other;

detecting said radiation at said point on said surface of said object; and calculating position information in response to said movement of said sources and said radiation detected at said point on said surface of said object.

23. The method of claim 22 further comprising the step of changing the phase of said radiation from one of said sources relative to the phase of said radiation from the other of said sources as measured at said point on said surface of said object.

24. The method of claim 22 wherein said sources of radiation are virtual sources of radiation.

25. The method of claim 22 wherein the step of moving each of said sources comprises changing said distance between said sources.

26. The method of claim 22 wherein said distance comprises a midpoint equidistant from each of said sources and wherein the step of moving each of said sources comprises changing said distance and keeping said midpoint fixed.

27. An apparatus for determining, on an object having a surface, a depth coordinate of a point on said surface of said object, said apparatus comprising:

two sources of radiation separated by a distance, said sources being coherent with respect to one another;

a control system moving each of said sources relative to each other;

a detector positioned at said point on said surface of said object to receive radiation illuminating said point on said surface of said object; and a processor receiving signals from said detector, said processor calculating position information of said point on said surface of said object in response to said movement of said sources and said radiation received at said point on said surface of said object.

28. The apparatus of claim 27 wherein said control system changes the phase of said radiation from one of said sources relative to the phase of said radiation from the other of said sources as measured at said point on said object.

29. The apparatus of claim 27 wherein said sources of radiation are virtual sources of radiation.

30. The apparatus of claim 27 wherein said control system moves each of said sources relative to each other to change said distance.

31. The apparatus of claim 27 wherein said distance comprises a midpoint equidistant from each of said sources and said control system moves each of said sources relative to each other to change said distance and keep said midpoint fixed.

* * * * *

UNITED STATES PATENT AND TRADEMARK OFFICE
CERTIFICATE OF CORRECTION

| | | |
|---|---|---|
| PATENT NO. | : 6,031,612 | Page 1 of 1 |
| APPLICATION NO. | : 09/241354 | |
| DATED | : February 29, 2000 | |
| INVENTOR(S) | : Lyle Shirley | |

It is certified that error appears in the above-identified patent and that said Letters Patent is hereby corrected as shown below:

Delete the paragraph titled 'GOVERNMENT SUPPORT' encompassing column 1, lines 15-18:

"Work described herein was supported by Federal Contract No. F19628-95-L-002, awarded by the United States Air Force. The Government may have certain rights in the invention."

and replace with:

--This invention was made with government support under Contract No. F19628-95-C-0002 awarded by the U.S. Air Force. The government has certain rights in this invention.--

Signed and Sealed this
Twenty-seventh Day of November, 2012

David J. Kappos
*Director of the United States Patent and Trademark Office*